United States Patent
Itagaki et al.

(10) Patent No.: US 8,724,539 B2
(45) Date of Patent: May 13, 2014

(54) WIRELESS COMMUNICATION SYSTEM, WIRELESS COMMUNICATION DEVICE AND WIRELESS COMMUNICATION METHOD, AND COMPUTER PROGRAM

(75) Inventors: Takeshi Itagaki, Tokyo (JP); Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 354 days.

(21) Appl. No.: 13/067,580

(22) Filed: Jun. 10, 2011

(65) Prior Publication Data

US 2011/0243006 A1 Oct. 6, 2011

Related U.S. Application Data

(62) Division of application No. 12/022,269, filed on Jan. 30, 2008, now Pat. No. 8,310,978.

(51) Int. Cl.
*H04B 7/14* (2006.01)

(52) U.S. Cl.
USPC ............ 370/315; 370/328; 370/341; 370/348

(58) Field of Classification Search
USPC ......... 370/315, 329, 338, 458, 328, 341, 348; 455/411; 709/245
See application file for complete search history.

(56) References Cited

U.S. PATENT DOCUMENTS

| | | | |
|---|---|---|---|
| 6,580,704 B1 * | 6/2003 | Wellig et al. .................. | 370/338 |
| 2002/0068548 A1 * | 6/2002 | Schroderus et al. .......... | 455/411 |
| 2006/0087995 A1 | 4/2006 | Nago | |
| 2006/0168343 A1 * | 7/2006 | Ma et al. ....................... | 709/245 |
| 2007/0008922 A1 * | 1/2007 | Abhishek et al. ............. | 370/329 |
| 2007/0104214 A1 * | 5/2007 | Hsieh et al. ................... | 370/458 |

FOREIGN PATENT DOCUMENTS

| | | |
|---|---|---|
| JP | 7-23464 | 1/1995 |
| JP | HEI 07-23464 | 1/1995 |
| JP | 2003-348103 | 12/2003 |
| JP | 2004-072565 | 3/2004 |
| JP | 2004-363645 | 12/2004 |
| JP | 2005-323150 | 11/2005 |
| JP | 2005-341231 | 12/2005 |
| JP | 2006-128949 | 5/2006 |
| JP | 2006-191532 | 7/2006 |
| WO | WO 2005/005092 A1 | 6/2005 |
| WO | WO 2005/050919 A2 | 6/2005 |
| WO | WO 2005/050920 A1 | 6/2005 |
| WO | WO 2006/095787 A1 | 9/2006 |

OTHER PUBLICATIONS

Japanese Office Action in corresponding application No. 2009-054776 dated Feb. 7, 2012, 8 pages.

* cited by examiner

*Primary Examiner* — Brian D Nguyen
*Assistant Examiner* — Toan Nguyen
(74) *Attorney, Agent, or Firm* — Sony Corporation

(57) ABSTRACT

A wireless communication system, wherein packet transmission operations are carried out in an infrastructure mode, includes: a first terminal station serving as a data transmission source; a second terminal station serving as a data receiving destination; and a control station configured to contain each terminal station and relay a packet transmitted between the two terminal stations; wherein the first terminal station transmits a packet addressed to the second terminal station via the control station, and detects that the second terminal station is within range capable of a direct link, based on the first terminal station receiving a confirmation response packet replied from the second terminal station, the confirmation response packet being replied from the second terminal station upon a predetermined period of time having passed from the time of the control station transferring the packet to the second terminal station address.

12 Claims, 23 Drawing Sheets

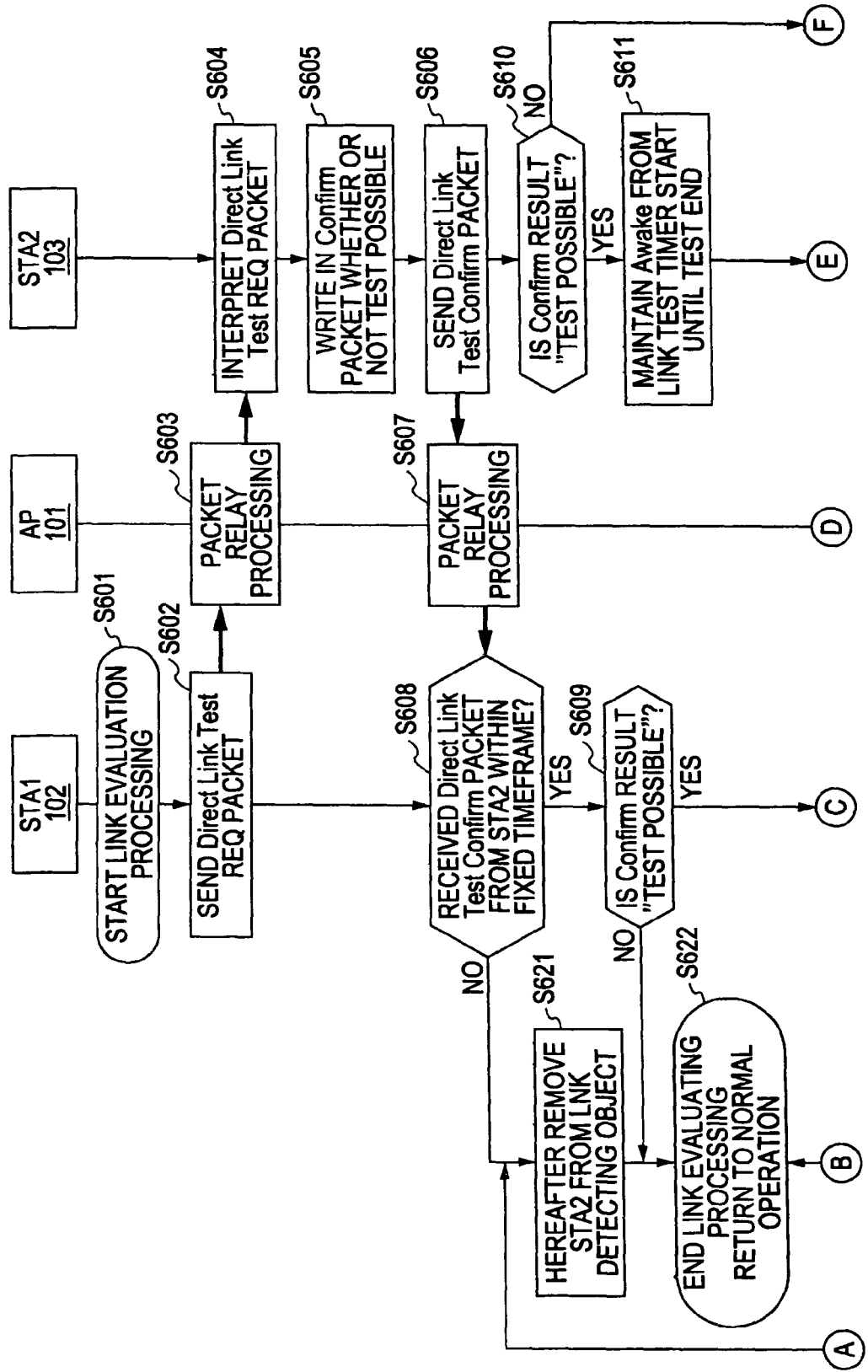

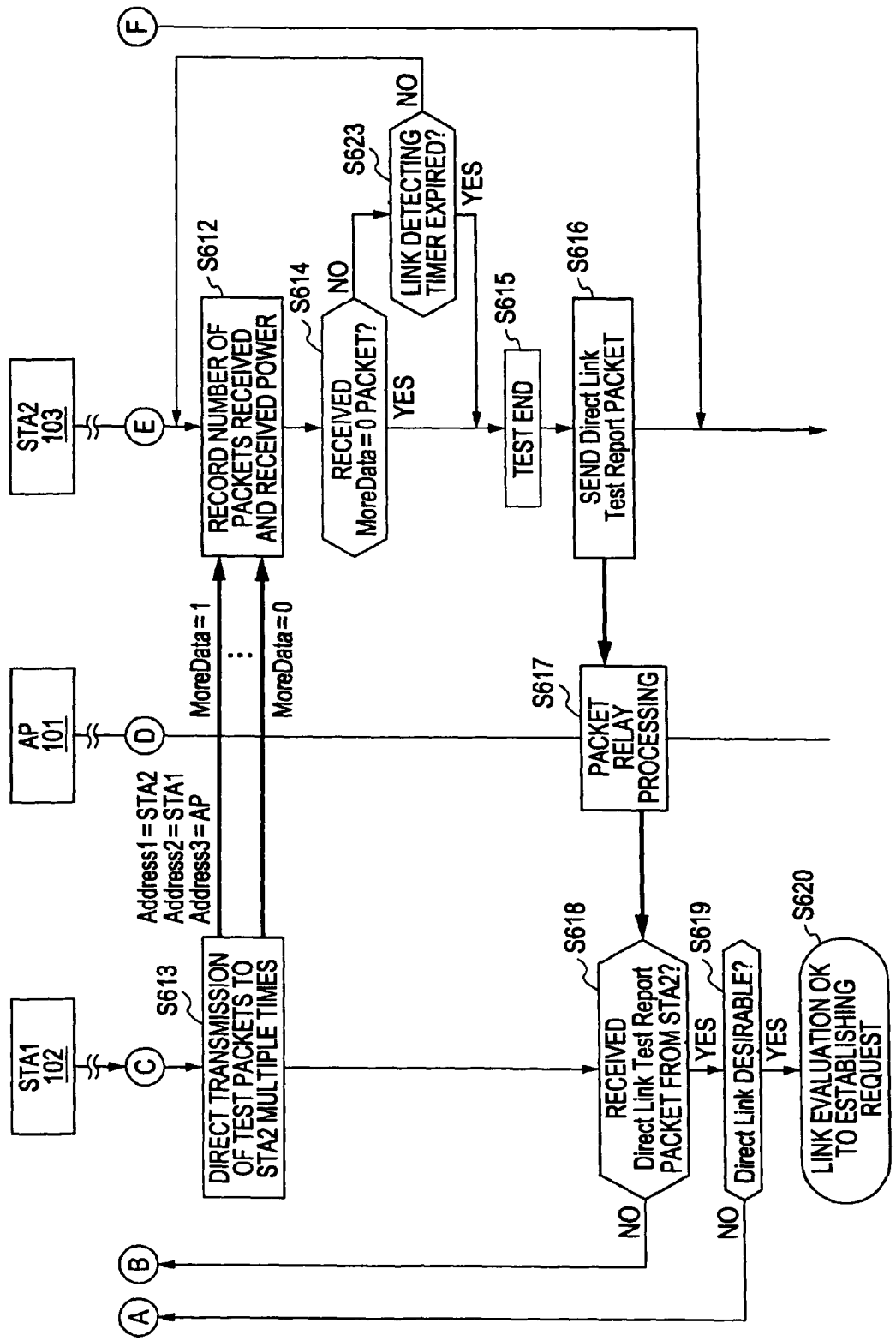

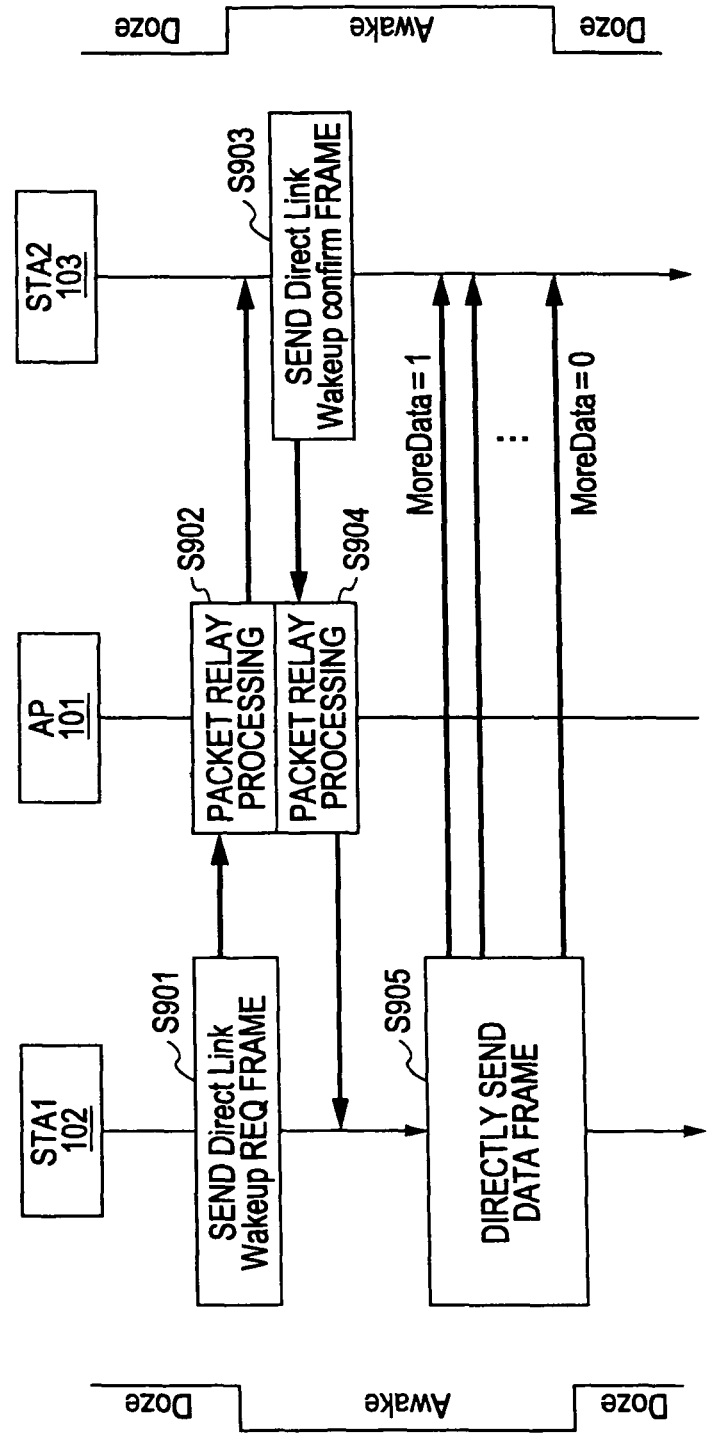

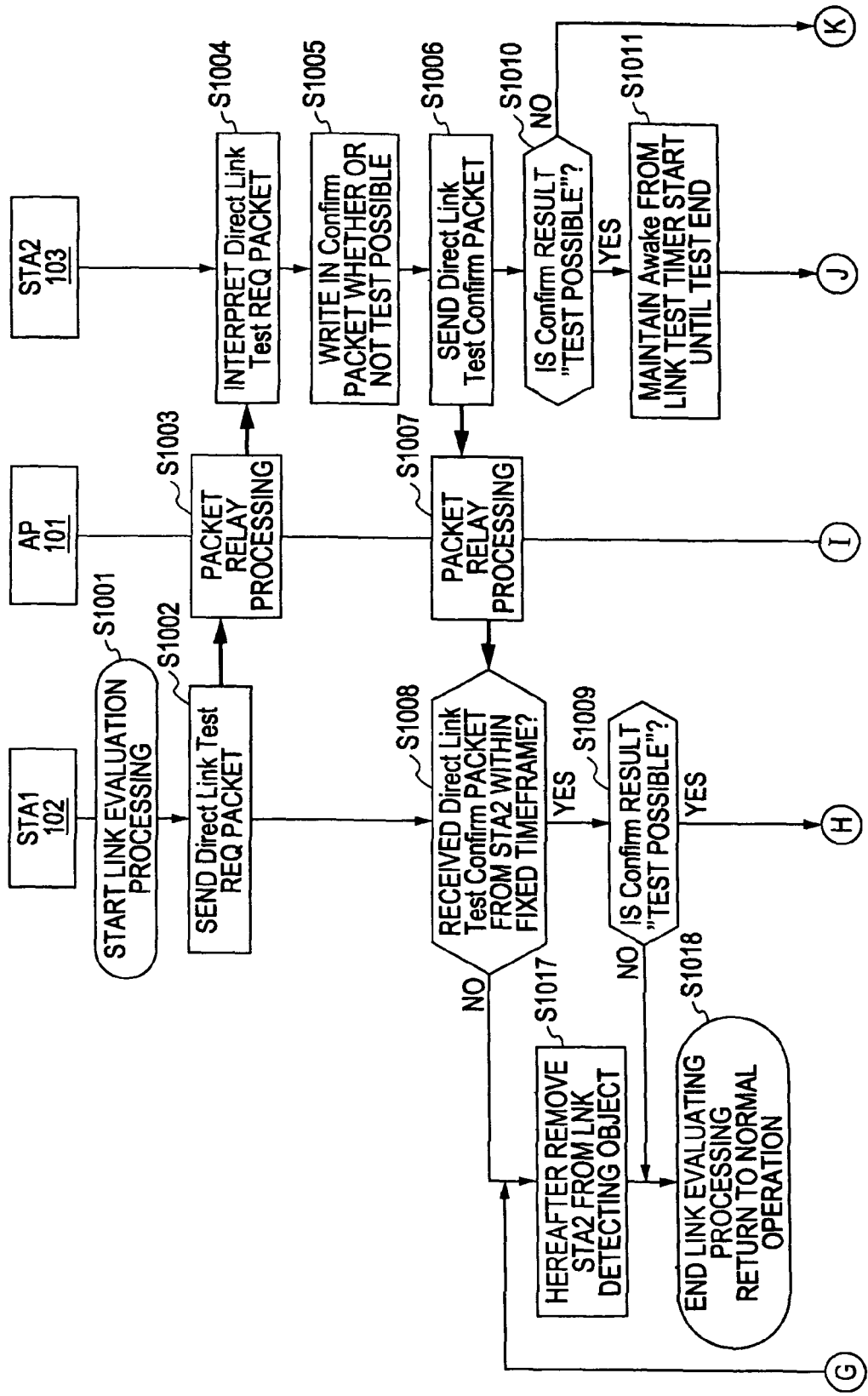

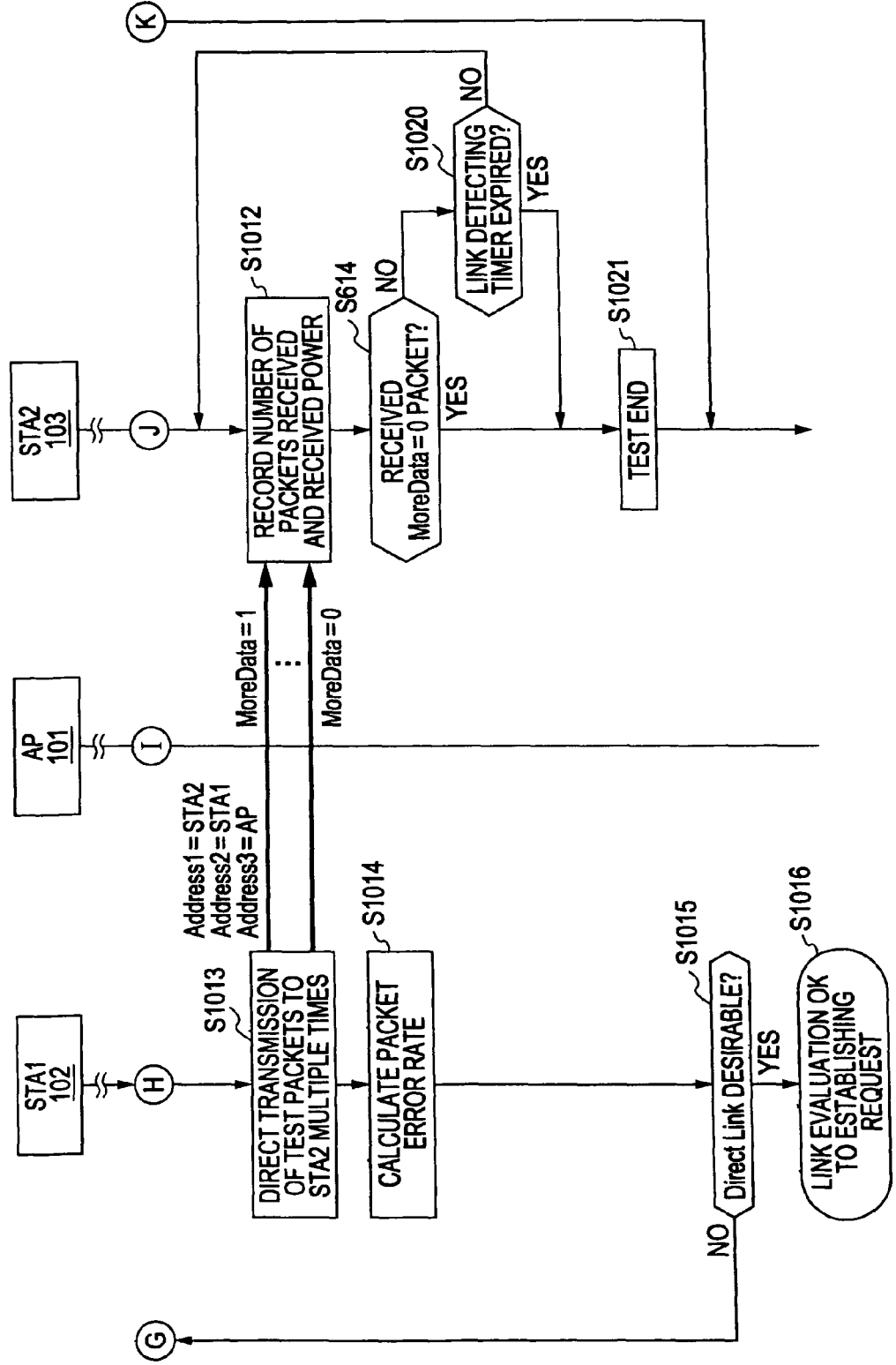

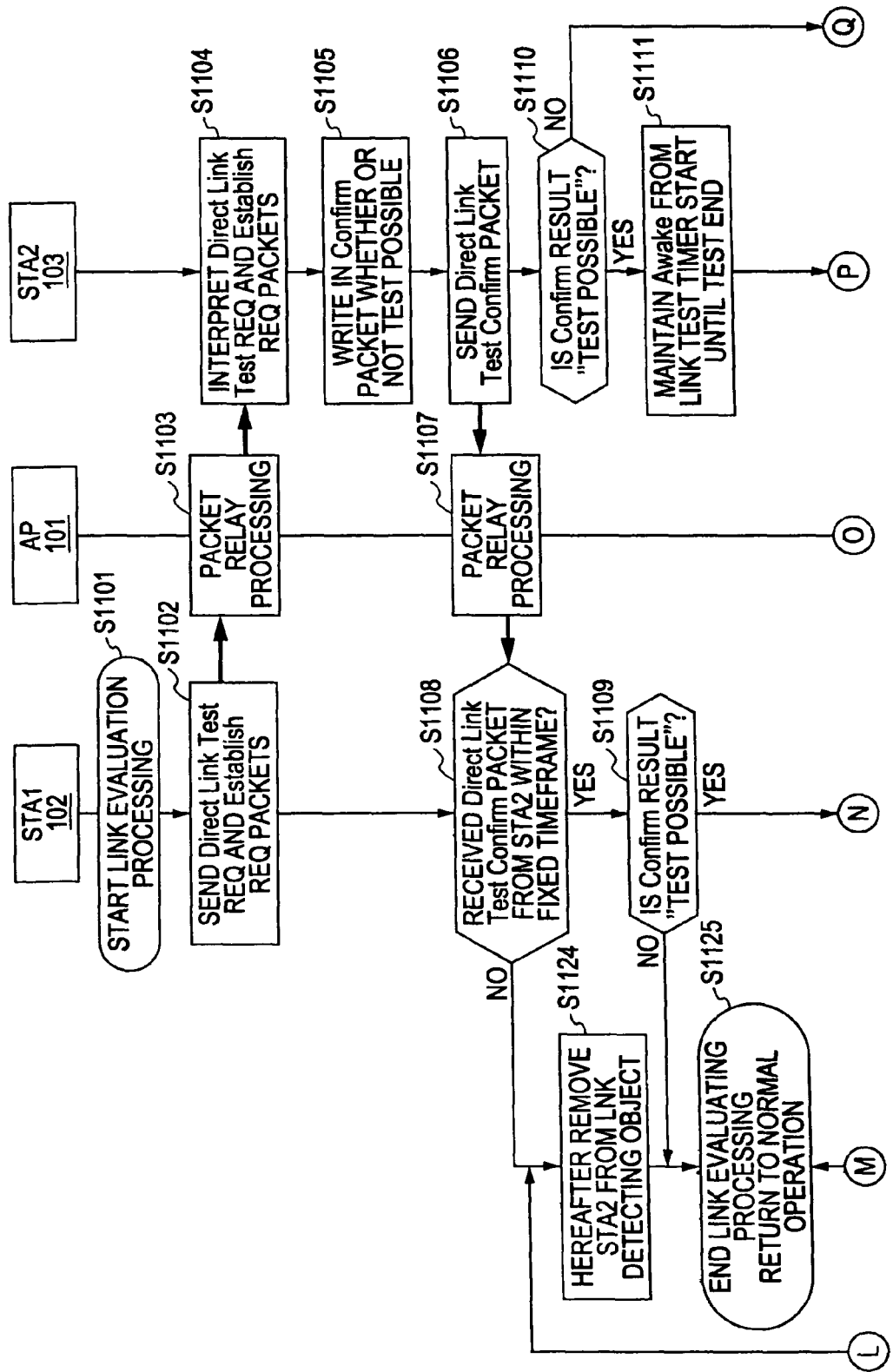

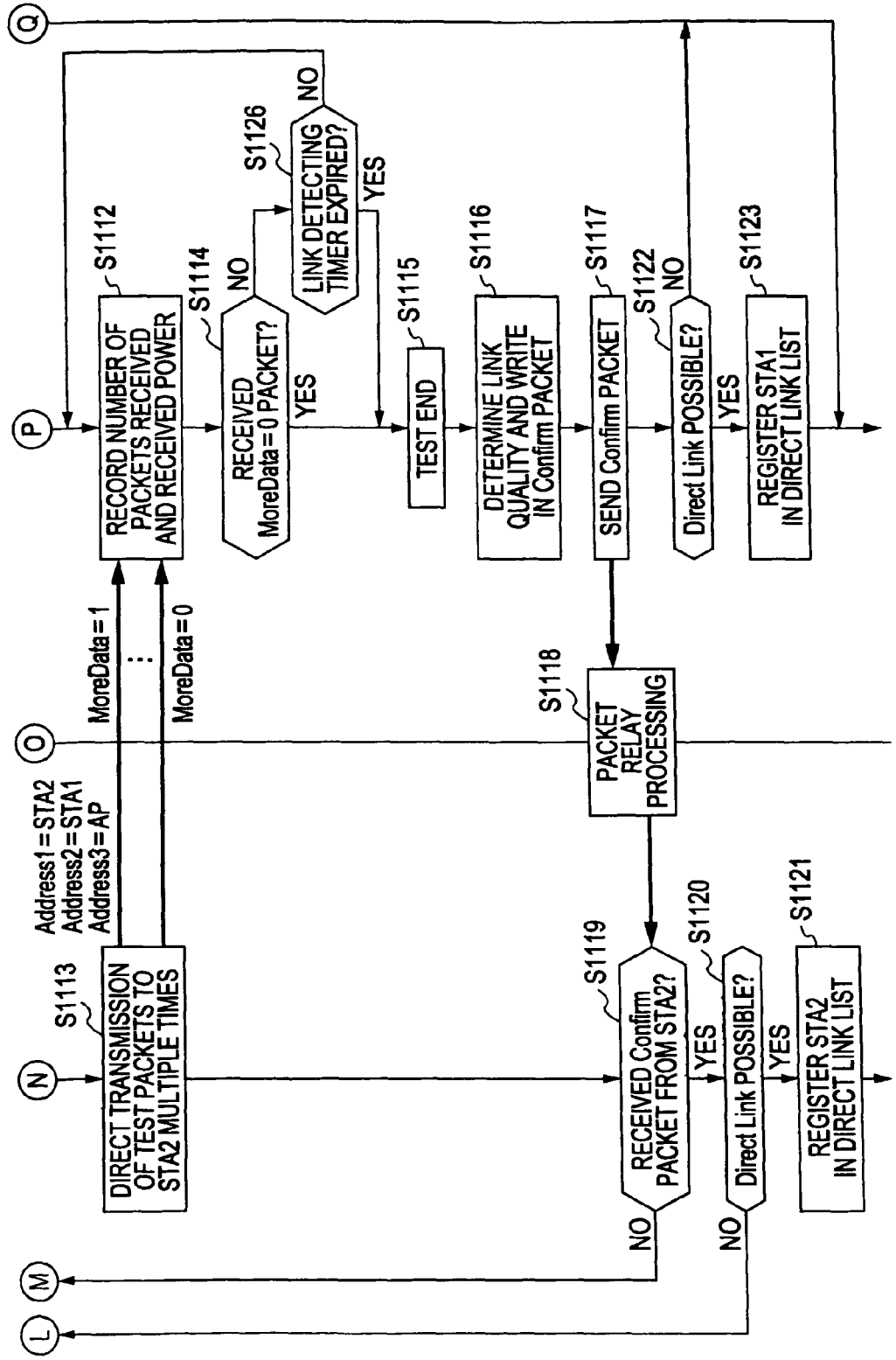

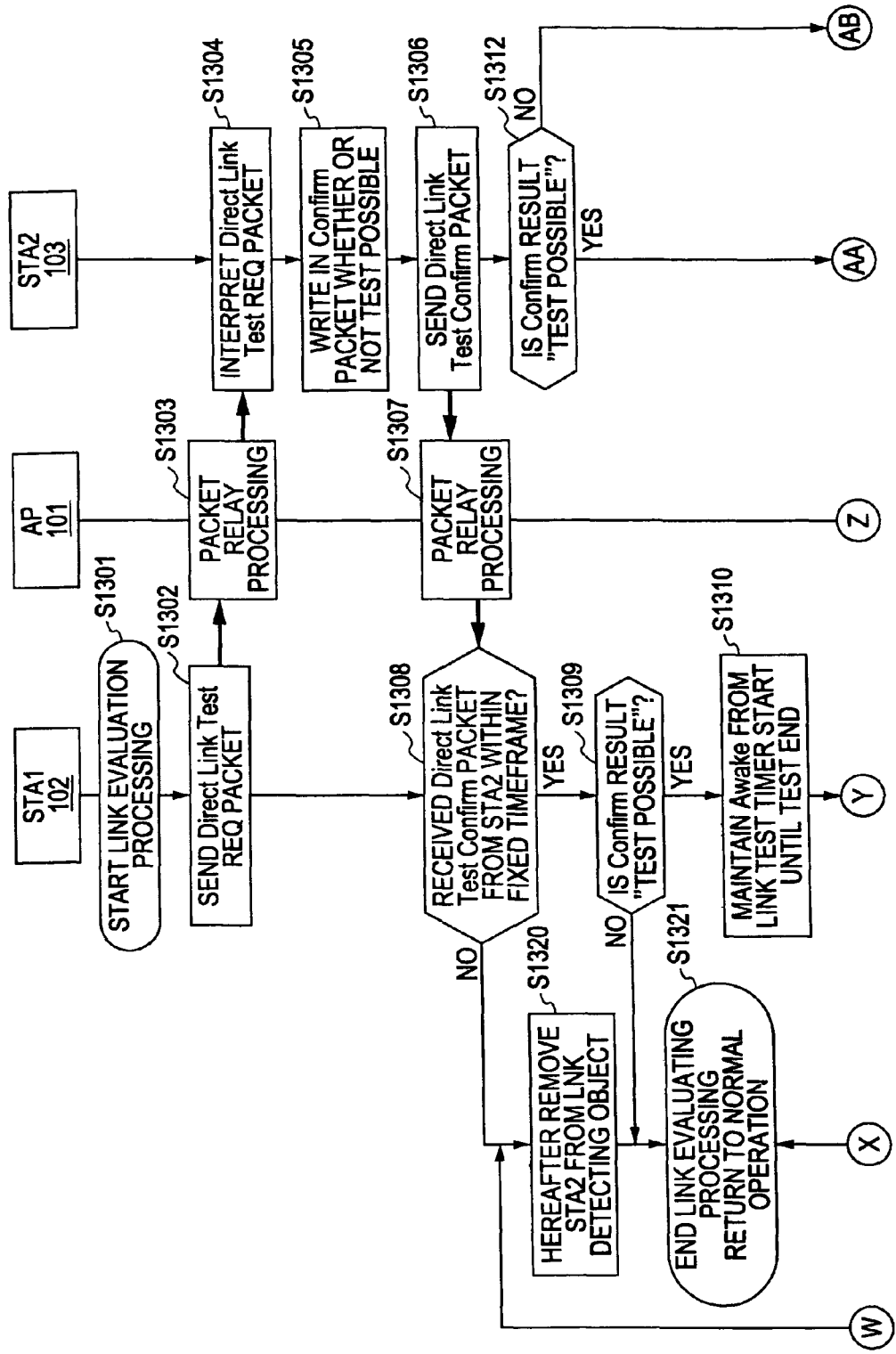

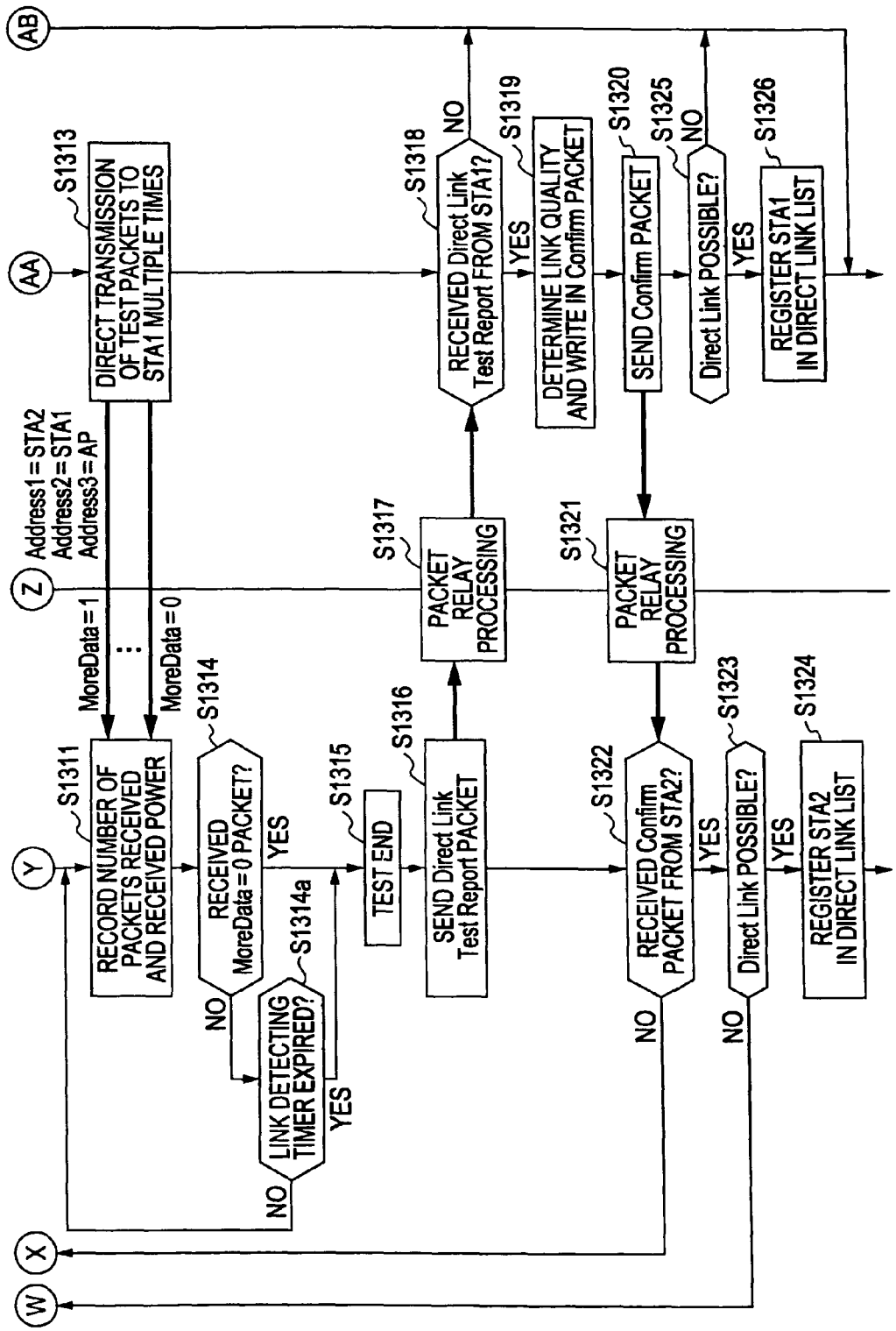

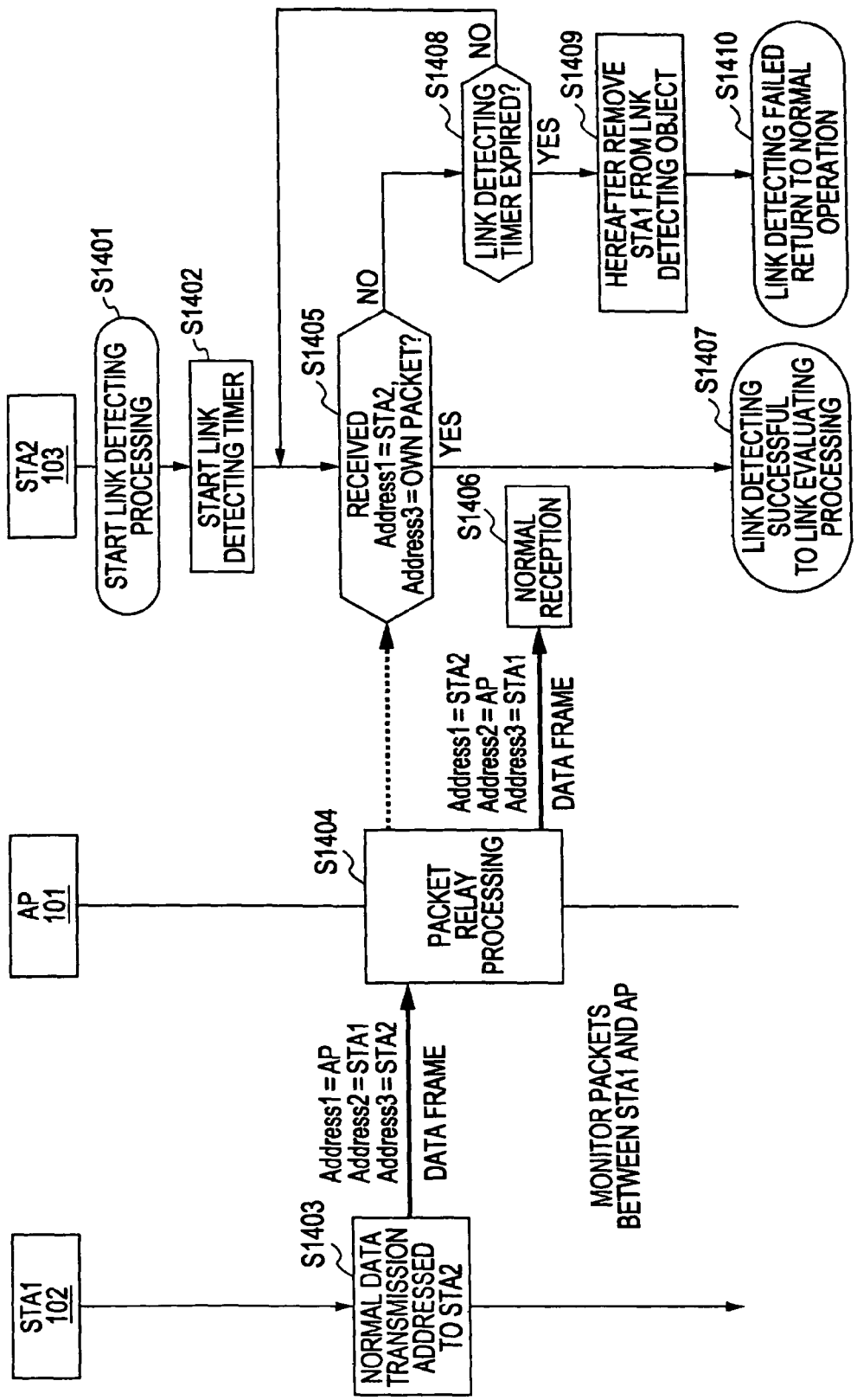

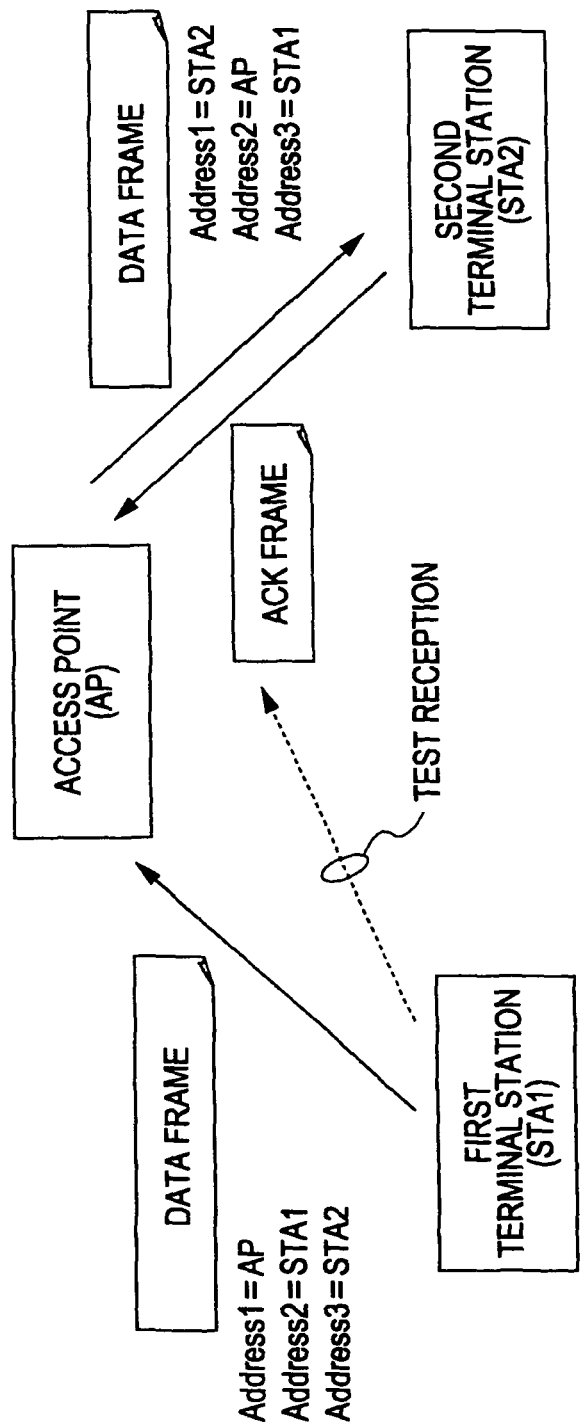

FIG. 17A

| Frame Control | Duration/ID | Address1 | Address2 | Address3 | Sequence Control | Address4 |

FIG. 17B

| Frame Control | Duration | RA | FCS |

WIRELESS COMMUNICATION SYSTEM, WIRELESS COMMUNICATION DEVICE AND WIRELESS COMMUNICATION METHOD, AND COMPUTER PROGRAM

CROSS REFERENCES TO RELATED APPLICATIONS

The application is a divisional of U.S. application Ser. No. 12/022,269, filed Jan. 30, 2008, now U.S. Pat. No. 8,310,978, which contains subject matter related to Japanese Patent Application JP 2007-024136 filed in the Japanese Patent Office on Feb. 2, 2007, both of which are incorporated herein by reference in their entirety.

BACKGROUND OF THE INVENTION

1. Field of the Invention

The present invention relates to a wireless communication system, wireless communication device and wireless communication method, and computer program such as a wireless LAN (Local Area Network) wherein communication is performed mutually between multiple wireless stations, and in particular relates to a wireless communication system, wireless communication device and wireless communication method, and computer program wherein a control station adjusts access timing for various terminal stations within a network, and wherein various terminal stations are mutually synchronized to perform wireless communication in an infrastructure mode.

2. Description of the Related Art

Wireless networks are gathering attention as systems to offer freedom from cables with cabled communication methods in related art. Examples of standard specifications relating to wireless networks are IEEE (The Institute of Electrical and Electronics Engineers) 802.11 and IEEE 802.15.

A method of providing one device serving as a control station called an "access point" (AP) or "coordinator" within an area to form a network under the overall control of the control station is generally employed in order to configure a local area network using wireless technology. The control station adjusts the access timing of multiple terminal stations within the network, and performs synchronous wireless communication wherein the various terminal stations are mutually synchronized.

Also, as another method to configure a wireless network, "Ad-hoc communication" has been proposed, wherein each terminal station operates in an autonomous decentralized "Peer-to-Peer" manner, wherein the terminal stations themselves determine the access timing. For a small-scale wireless network made up of relatively few clients located near each other, ad hoc communication which can perform wireless communication asynchronously directly between terminals arbitrarily, without using a particular control station, may be appropriate.

For example, networking with IEEE 802.11 is based on the concept of BSS (Basic Service Set). BSS is made of up of two types, which are BSS wherein a control station is defined by an existing "infrastructure mode", and an IBSS (Independent BSS) which is defined by an ad hoc mode configured only by multiple MT (Mobile Terminals).

With the infrastructure mode, the control station handles a range around itself where waves can reach as a BSS, so as to configure a "cell" in a so-called cellular system. The terminal station existing near the control station is contained by the control station, and enters the network as a BSS member. That is to say, the control station sends a control signal called a beacon at appropriate time intervals, recognizes that the terminal station which can receive this beacon exists near the control station, and further establishes a connection with the control station.

When in infrastructure mode, only the control station sends a beacon at a predetermined frame cycle. Otherwise, the periphery MT enters the network by receiving a beacon from an AP, and does not send a beacon itself.

FIG. 19 shows an operation example of IEEE 802.11 during infrastructure mode. In the example shown, the communication station STA0 operates as the control station, and other communication stations STA1 and STA2 operate as terminal stations. The communication stations STA0 serving as a control station sends a beacon at a fixed time interval, as shown in the chart on the right side of the diagram. The transmission point-in-time for the next beacon is managed within the control station as a parameter called TBTT (Target Beacon Transmit Time). When the point-in-time reaches TBTT, the control station operates beacon transmission procedures.

The terminal stations STA1 and STA2 in the periphery of the control station can receive the beacon alarm from the control station, and recognize the next beacon transmission point-in-time from an internal Beacon Interval field and the point-in-time of receiving the beacon. The terminal station can switch to Power Save mode (in the case receiving is not necessary) and only perform receiving operations intermittently, whereby power consumption can be reduced. Specifically, the terminal station enters a sleep state (Doze) wherein power to the receiver is lowered until the beacon receiving point-in-time (TBTT) for the next time or for multiple times to come. The timing for the various terminal stations in Power Save mode to start up (Wake) is managed in an integrated manner in the control station.

On the other hand, with the IBSS ad hoc mode, IBSS is autonomously defined after negotiating with another terminal station. The terminal station group herein fixes the TBTT as a fixed time interval. By recognizing that the TBTT has arrived by referencing a clock within the station itself, each terminal station sends a beacon, following a delay of random back-off, in the case recognition is made that no terminal station has sent a beacon.

FIG. 20 shows an operation example of IEEE 802.11 during ad hoc mode. The example in the diagram shows a state wherein two terminal stations (MT) make up an IBSS. In this case, one of the MTs belonging to the IBSS send the beacon each time a TBTT arrives. Also, there are cases wherein the beacons sent from various MTs collide. Also, with IBSS also, the MT may enter a sleep state to turn off the power of the transmitter/receiver as necessary.

SUMMARY OF THE INVENTION

With an infrastructure mode which routes via the control station, the various terminal stations thereunder can be connected to a backbone network such as a cable LAN or the Internet. However, since wireless communication via a control station is necessary, the usage efficiency of a transfer path is decreased by half, causing a problem wherein throughput is decreased as compared to the ad hoc mode. On the other hand with the ad hoc mode, there is no overhead from the control station relay since the terminal stations directly communicate with one another and thus throughput increases, but there is the problem of not being able to connect to a backbone network such as a cable LAN or the Internet.

As a method to utilize the strengths of these two modes, a DLP (direct link protocol) is defined as an option function with IEEE 802.11e-D13.0. With this method, a direct communication link is set between the terminal stations, enabling direct communication while maintaining the infrastructure mode.

Description is made above that if the terminal stations are directly communicating with one another, there is no more overhead accompanied with routing through the control station, so intuitively speaking, throughput should improve. However, even if DLP is performed to establish direct communication, if the communication partner is not in a location where sufficient waves can reach, and a location where communication quality can be obtained, i.e. if the communication partner is not within the direct link range, this can result in decreased throughput due to frequent packet errors and the like. Therefore, a method to confirm whether or not direct communication is possible with the communication partner is necessary.

For example, a wireless communication device has been proposed to link-connect as to another terminal station via the control station, confirm whether or not direct wireless communication is possible as to the link-connected other terminal station, and communicate predetermined communication data with direct wireless communication with the other terminal station (for example, see Japanese Unexamined Patent Application Publication No. 2003-348103).

Also, a wireless LAN system has been proposed to receive all waves the other terminal station produces in advance, and create a list of terminal stations wherefrom reception has been made, thereby determining whether or not the terminal station is capable of direct communication (for example, see Japanese Unexamined Patent Application Publication No. 2004-72565). With this system, multiple terminal stations are connected in a network configured with the control station as a center thereof, and in the case that each terminal station exists mutually within wireless communication capable range, the terminal stations perform wireless LAN communication with one another in ad hoc mode under the management of the control station. Each control station receiving the network information sent by the control station responds to this with at least a reply of address information, each terminal station receiving address information creates an address table based on the address information, and by referencing this table when performing communication in ad hoc mode, determination can be made as to whether or not communication is possible in ad hoc mode.

However, in order to obtain the wireless packet type or the terminal station address of the transmission source, with both of these methods which perform direct communication between terminals, all of the terminal stations must send a dedicated packet in response to instructions from the control station side after having sent dedicated packets in advance, and direct link negotiations or quality measurements must be made even as to partner terminal stations with no actual data desired to be exchanged, whereby the processing load of the system overall tends to greatly increase.

As yet another method for confirming the capability of direct communication with a communication partner, a communication system is proposed to establish a direct link protocol (DLP) mode in advance, send an ICMP echo request by direct communication, and determine whether or not direction communication is possible by counting the number of replies therefrom (for example, see Japanese Unexamined Patent Application Publication No. 2006-128949).

However, each of the three above-described types of communication methods have the problem wherein the operations thereof cannot be realized without a DLP or similar dedicated function on the control station side.

Also, with the direct link mode specified with IEEE 802.11e-D13.0, there is the problem of not being able to enter Power Save mode after link setup. With the infrastructure mode, the timing for each terminal station to Wake is managed centrally by the control station, meaning that the terminal stations cannot know the waking state of the communication partner, and accordingly this arrangement is dependent on being in a constant waking state in order for a packet to be delivered in a sure manner.

There has been recognized the need to provide an excellent wireless communication system, wireless communication device and wireless communication method, and computer program, which enables setting direct communication links between terminal stations to directly communicate while maintaining an infrastructure mode.

There has also been recognized the need to provide an excellent wireless communication system, wireless communication device and wireless communication method, and computer program, which enables suitably confirming whether or not direction communication is capable between the terminal stations and setting a direction communication link with a communication partner without decreased throughput.

There has also been recognized the need to provide an excellent wireless communication system, wireless communication device and wireless communication method, and computer program, which enables suitably confirming whether or not direction communication is capable between the terminal stations and setting a direction communication link with a communication partner without decreased throughput, and without using a dedicated function on the control station side such as DLP.

There has also been recognized the need to provide an excellent wireless communication system, wireless communication device and wireless communication method, and computer program, which enables each terminal station to switch to Power Save mode, while enabling staring direct communication with communication partners without recognizing the waking states thereof.

According to an embodiment of the present invention, a wireless communication system, wherein packet transmission operations are carried out in an infrastructure mode, includes: a first terminal station serving as a data transmission source; a second terminal station serving as a data receiving destination; and a control station configured to contain each terminal station and relay a packet transmitted between the two terminal stations; wherein the first terminal station transmits a packet addressed to the second terminal station via the control station, and detects that the second terminal station is within range capable of a direct link, based on the first terminal station receiving a confirmation response packet replied from the second terminal station, the confirmation response packet being replied from the second terminal station upon a predetermined period of time having passed from the time of the control station transferring the packet to the second terminal station address.

Note that "system" as used here indicates a system wherein multiple devices (or functional modules to realize a specific function) are logically collected, and is not particular as to whether or not each device or functional module is within a single casing (the same can be said hereafter).

With infrastructure mode, the various terminal stations under control can be connected to a backbone network such as a cable LAN or the Internet, but data transmission is performed via a control station, thereby decreasing usage efficiency by half. Thus, a communication method wherein a direct link between terminal stations is set and direction communication is performed without routing via a control station, while maintaining the infrastructure mode, is desirable.

However, if the communication partner is not in a location where sufficient waves can reach, and a location where communication quality can be obtained, this can result in decreased throughput due to frequent packet errors and the like. Therefore, a method to confirm whether or not direct communication is possible with the communication partner is necessary.

The wireless communication system according to an embodiment of the present invention is arranged such that normal transmitting/receiving operations between a control station and terminal station performed in infrastructure mode is used to determine whether or not the communication partner desired to establish a direct link with is within the direct link range. In such a case, the processing to confirm the capability of direct communication with a communication partner can be performed with minimal load. Also, the wireless quality of the direct link is measured before establishing the direct link with the desired communication partner, whereby decreasing throughput by performing direct communication with a communication partner unable to obtain sufficient communication quality can be avoided.

Specifically, according to an embodiment of the present invention, the first terminal station only need to wait to receive a normal Ack packet which is replied from the second terminal station. That is to say, detecting processing of a direct link can be performed without use of a dedicated packet, so processing load of the system overall can be suppressed.

The first terminal station may start the detecting operation in accordance with transmission data having been generated to the second terminal station, or with a data request having been received from the second terminal station.

According to an embodiment of the present invention, a wireless communication system, wherein packet transmission operations are carried out in an infrastructure mode, includes: a first terminal station serving as a data transmission source; a second terminal station serving as a data receiving destination; and a control station configured to contain each terminal station and relay a packet transmitted between the two terminal stations; wherein the first terminal station sends a direct link test request to the second terminal station via the control station, and following receiving confirmation response as to the test request from the second terminal station via the control station, directly sends a test packet to the second terminal station address; wherein the second terminal station records information including the number of test packets received from the first terminal station or the receiving power thereof, and sends a report packet with this recorded information written therein to the first terminal station via the control station; and wherein the first terminal station performs evaluation of the direct link between the first terminal station and the second terminal station, based on information written in the report packet.

According to this configuration, the first terminal station can evaluate the direct link of a second terminal station as communication partner with which a direct link is detected. Also, the wireless quality of the direct link is measured before establishing the direct link with the second terminal station, whereby decreasing throughput by performing direct communication with a communication partner unable to obtain sufficient communication quality can be avoided.

Now, the second terminal station can write information relating to the wireless link between the control station and second terminal station in the confirmation response as to the test request. In such a case, the first terminal station can comprehensively perform evaluation as compared to direct link communication between the first terminal station and second terminal station via a control station, based on information including the number of test packets received which are written in the report packet, or the receiving power thereof, and information relating to the wireless link between the control station and second terminal station.

Also, according to an embodiment of the present invention, a wireless communication system, wherein packet transmission operations are carried out in an infrastructure mode, includes: a first terminal station serving as a data transmission source; a second terminal station serving as a data receiving destination; and a control station configured to contain each terminal station and relay a packet transmitted between the two terminal stations; wherein a direct link is established between the first terminal station and the second terminal station; and wherein the first terminal station sends a direct communication request as to the second terminal station address via the control station, and starts direct communication with the second terminal station in accordance with a confirmation response received from the second terminal station via the control station.

According to this configuration, each terminal station can be switched to Power Save mode even after a direct link is established, whereby the terminal stations can start direction communication with a communication partner without recognizing the waking state of one another.

In the case that the first terminal station and the second terminal station are operated with a low-power operation mode to perform receiving operations intermittently even during the time that a direct link is established therebetween, the control station may transfer the direct link communication request along with timing for the second terminal station to be in Awake state, while transferring the confirmation response along with timing for the first terminal station to be in Awake state.

If the data transmission will not be affected by a delay, the respective power stations can carry out operations in Power Save mode, even after a direct link is established between the first terminal station and second terminal station. In order for the first terminal station to start direct link communication, a request with such information is transferred to the second terminal station via the control station. The control station manages the waking state of the various terminal stations contained in the BSS in an integrated manner, and can transfer the request for direct link communications at a timing wherein each terminal station is in an Awake state, and the confirmation response thereto, to each terminal station.

Also, according to an embodiment of the present invention, a wireless communication system, wherein packet transmission operations are carried out in an infrastructure mode, includes: a first terminal station serving as a data transmission source; a second terminal station serving as a data receiving destination; and a control station configured to contain each terminal station and relay a packet transmitted between the two terminal stations; wherein the first terminal station directly sends a test packet to the second terminal station for testing a direct link; and wherein detection is made that the second terminal station is within range capable of a direct link; and evaluation is performed of the direct link between the first terminal station and the second terminal station; based on the number of times an Ack packet is returned from the second terminal station and the receiving power thereof.

In the case of simultaneously performing detecting of a direct link and the evaluation thereof with such procedures, there is a risk of transmitting a test packet even in a situation wherein a link cannot be detected, but advantages can be obtained whereby the load on the second terminal station which is the data receiving destination can be reduced and processing is therefore simplified.

Also, according to an embodiment of the present invention, a wireless communication system, wherein packet transmission operations are carried out in an infrastructure mode, includes: a first terminal station serving as a data transmission source; a second terminal station serving as a data receiving destination; and a control station configured to contain each terminal station and relay a packet transmitted between the two terminal stations; wherein the first terminal station sends a direct link test request to the second terminal station via the control station, and following receiving confirmation response as to the test request from the second terminal station via the control station, directly sends a test packet to the second terminal station address; wherein the second terminal station records information including the number of test packets received from the first terminal station or the receiving power thereof, and performs evaluation of the direct link between the first terminal station and the second terminal station, based on the recorded information; and sends the evaluation results thereof to the first terminal station via the control station.

This configuration differs from an above-described configuration in that an arrangement is made wherein determining the capability of establishing a link is deferred to the second terminal station which is the data receiving destination, but in this case, the direct link establishing request and response processing thereof can be included in the evaluating processing and thus simplified.

The first terminal station may write information relating to the wireless link between the first terminal station and control station into the test request. In such a case, the second terminal station can comprehensively perform evaluation as compared to direct link communication between the first terminal station and second terminal station via a control station, based on information including the number of test packets received, or the receiving power thereof, and information relating to the wireless link between the first terminal station and the control station.

Also, according to an embodiment of the present invention, a wireless communication system, wherein packet transmission operations are carried out in an infrastructure mode, includes: a first terminal station serving as a data transmission source; a second terminal station serving as a data receiving destination; and a control station configured to contain each terminal station and relay a packet transmitted between the two terminal stations; wherein the first terminal station sends a direct link test request to the second terminal station via the control station; wherein the second terminal station sends a test packet to the first terminal station address following sending a confirmation response as to the test request from the first terminal station via the control station; and wherein the first terminal station records information including the number of test packets received from the second terminal station and performs evaluation of the direct link between the first terminal station and the second terminal station based on the recorded information.

According to this configuration, a test packet can be sent from the second terminal station side which is the data receiving destination to perform evaluation of a direct link at the first terminal station which is the data transmission source.

Now, the second terminal station may write information relating to the wireless link between the control station and the second terminal station into the confirmation response as to the test request. In such a case, the first terminal station can comprehensively perform evaluation as compared to direct link communication between the first terminal station and second terminal station via a control station, based on information including the number of received test packets, or the receiving power thereof, and information relating to the wireless link between the control station and second terminal station.

Also, according to an embodiment of the present invention, a wireless communication system, wherein packet transmission operations are carried out in an infrastructure mode, includes: a first terminal station serving as a data transmission source; a second terminal station serving as a data receiving destination; and a control station configured to contain each terminal station and relay a packet transmitted between the two terminal stations; wherein the first terminal station sends a direct link test request to the second terminal station via the control station, wherein the second terminal station directly sends a test packet to the first terminal station address following sending a confirmation response as to the test request from the first terminal station via the control station; wherein the first terminal station records the information including the number of test packets received from the second terminal station or the receiving power thereof and sends the report packet with the recorded information to the second terminal station via the control station; and wherein the second terminal station records information including the number of test packets received from the second terminal station {???} and performs evaluation of the direct link between the first terminal station and the second terminal station based on the recorded information.

According to this configuration, a test packet can be sent from the second terminal station side which is the data receiving destination, while performing evaluation of the direct link at the second terminal station. In this case, by deferring the determination of whether or not a link can be established to the second terminal station, the direct link establishing request and response processing thereof can be included in the evaluating processing and thus simplified.

Now, the first terminal station may write information relating to the wireless link between the first terminal station and control station into the report packet. In such a case, the second terminal station can comprehensively perform evaluation as compared to direct link communication between the first terminal station and second terminal station via a control station, based on information including the number of test packets received which are written in the report packet, or the receiving power thereof, and information relating to the wireless link between the control station and first terminal station.

Also, according to an embodiment of the present invention, a wireless communication system, wherein packet transmission operations are carried out in an infrastructure mode, includes: a first terminal station serving as a data transmission source; a second terminal station serving as a data receiving destination; and a control station configured to contain each terminal station and relay a packet transmitted between the two terminal stations; wherein the second terminal station detects that the first terminal station is within range capable of a direct link, based on receiving a data packet addressed to itself which is sent from the first terminal station to the control station.

According to this configuration, in the case of the first terminal station transmitting data to its own station address, the second terminal station can await reception of the packet which the first terminal station attempts to deliver via the control station. That is to say, as with an above-described configuration of an embodiment of the present invention, detecting processing for a direct link can be performed without using a dedicated packet, so the processing load of the overall system can be reduced.

The second terminal station can start detecting operations in accordance with receiving a data packet from the first terminal station via the control station, or with a data request generated to the first terminal station.

Also, with various embodiments of the present invention as mentioned above, the first or second terminal stations can send a negotiation packet used in the event of evaluating or establishing a direct link, such as a test request and confirmation response thereto, or a direct communication request and confirmation response thereto, by employing Qos Null Embedding Management Action which is defined in IEEE 802.11n-D1.0 to encapsulate a data-type frame.

Also, according to an embodiment of the present invention, with a computer program written in a computer-readable format so as to cause a computer to execute processing for sending data contained in a control station in an infrastructure mode as to a communication partner station, the processing includes: first processing for sending a packet to the communication partner station address via the control station; second processing for receiving the packet transferred by the control station to the communication partner station; third processing for awaiting reception of a confirmation response packet replied from the communication partner station when a predetermined period of time has passed since the packet is received with the second processing; and fourth processing for detecting that the communication partner station is within range capable of a direct link, based on receiving a confirmation response packet received in the third processing.

Also, according to an embodiment of the present invention, with a computer program written in a computer-readable format so as to cause a computer to execute processing for receiving data contained in a control station in an infrastructure mode as to a communication partner station, the processing includes: detecting processing for detecting that the communication partner station is within range capable of a direct link, based on receiving a data packet addressed to itself which is sent from the communication partner station to the control station.

The computer program is a computer program written in a computer-readable format so as to realize predetermined processing on a computer. In other words, by installing the computer program according one embodiment the present invention on a computer, cooperative actions are exhibited on the computer, and with the wireless communication system relating to one embodiment of the present invention, similar advantages can be obtained by operating as the first terminal station. Also, by installing the computer program according to another embodiment of the present invention on a computer, cooperative actions are exhibited on the computer, and with the wireless communication system relating to another embodiment of the present invention, similar advantages can be obtained by operating as the second terminal station.

According to embodiments of the present invention, an excellent wireless communication system, wireless communication device and wireless communication method, and computer program can be provided wherein a direct connection link can be set between terminal stations to directly communication while retaining the infrastructure mode.

Also, according to embodiments of the present invention, an excellent wireless communication system, wireless communication device and wireless communication method, and computer program can be provided wherein direct communication capability between terminal stations can be favorably confirmed and a direct communication link can be set with a communication partner without decreased throughput.

Also, according to embodiments of the present invention, an excellent wireless communication system, wireless communication device and wireless communication method, and computer program can be provided wherein direct communication capability between terminal stations can be favorably confirmed and a direct communication link can be set with a communication partner without decreased throughput, without employing a dedicated function such as DLP on the control station side.

Also, according to embodiments of the present invention, an excellent wireless communication system, wireless communication device and wireless communication method, and computer program can be provided wherein each terminal station can switch to low-power mode, while direct communication with a communication partner can be started without recognizing the waking state of one another.

With the wireless communication system according to embodiments of the present invention, even if the control station does not correspond to the direct link setup (DLS) with IEEE 802.11e specifications, a direct link can be established and usage efficiency of the transmission bandwidth improved without special functions added to the control station.

Also, with the wireless communication system according to embodiments of the present invention, determination can be made as to whether or not the communication partner desired for establishing a direct link is within range for a direct link by using normal sending/receiving operations between the control station and terminal station in infrastructure mode, with minimum load. By measuring the wireless quality of the direct link by thus using normal sending/receiving operations, measurements can be made before establishing a direct link with the desired communication partner.

Also, with the wireless communication system according to embodiments of the present invention, unlike the direct link mode specified with IEEE 802.11e-D13.0, even after temporarily establishing a direct link between terminal stations, the various terminal stations can operate (receiving operations performed only intermittently) while retaining the Power Save mode, thus realizing lower power consumption.

Other objects, features, and advantages of the present invention will be made clear by detailed description of the embodiments of the present invention to be described below based on the attached diagrams.

BRIEF DESCRIPTION OF THE DRAWINGS

FIG. 6A is a diagram illustrating detailed procedures for direct link evaluating processing according to the first embodiment;

FIG. 6B is a diagram illustrating detailed procedures for direct link evaluating processing according to the first embodiment;

FIG. 9 is a diagram illustrating processing procedures for performing communication between the first terminal station 102 and the second terminal station 103 following direct link establishing according to the first embodiment;

FIG. 10A is a diagram illustrating the processing procedures for simultaneously executing direct link detecting processing and direct link evaluating processing according to a second embodiment;

FIG. 10B is a diagram illustrating the processing procedures for simultaneously executing direct link detecting processing and direct link evaluating processing according to the second embodiment;

FIG. 11A is a diagram illustrating the processing procedures for simultaneously executing direct link evaluating processing and direct link establishing processing according to a third embodiment;

FIG. 11B is a diagram illustrating the processing procedures for simultaneously executing direct link evaluating processing and direct link establishing processing according to the third embodiment;

FIG. 13A illustrates procedures for direct link evaluating processing according to a fifth embodiment;

FIG. 13B illustrates procedures for direct link evaluating processing according to the fifth embodiment;

FIG. 14 is a diagram illustrating procedures for direct link detecting processing according to a sixth embodiment;

FIG. 16 is a diagram illustrating a state of transmitting a data frame from the first terminal station 102 to the second terminal station 103 while in infrastructure mode;

FIG. 17A is a diagram illustrating a format for a MAC header portion;

FIG. 17B is a diagram illustrating a format for an ACK frame;

DESCRIPTION OF THE PREFERRED EMBODIMENTS

Embodiments of the present invention will now be described in detail with reference to the diagrams.

Figure 1:
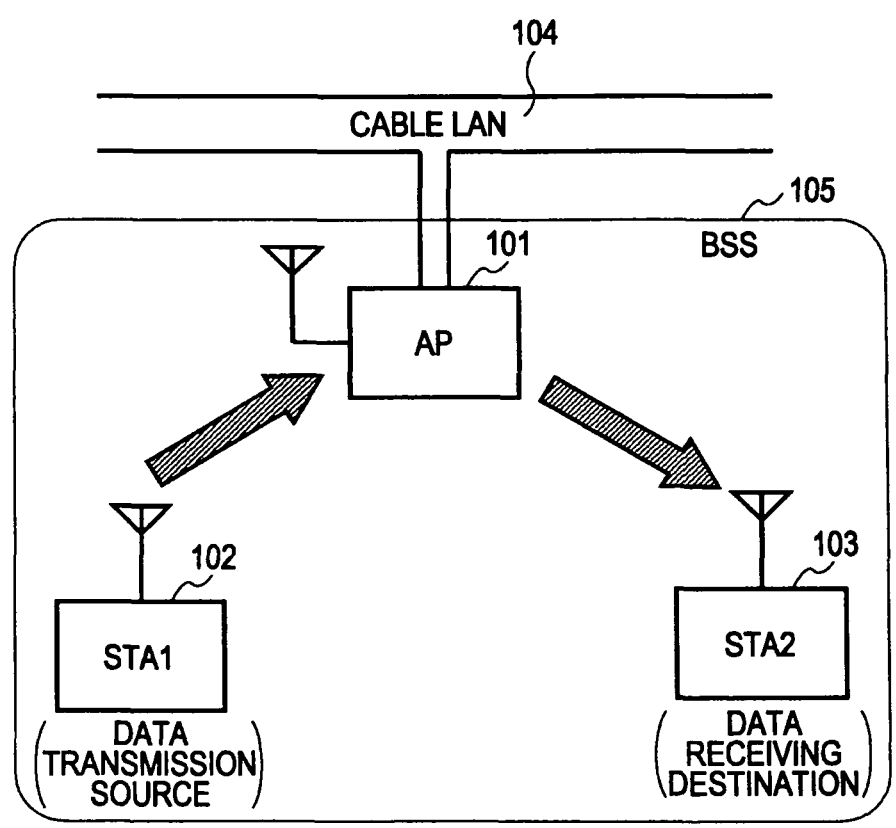
FIG. 1 is a schematic diagram of a configuration of the communication system relating to an embodiment of the present invention.

FIG. 1 is a schematic diagram of a configuration of the communication system relating to an embodiment of the present invention. In the same diagrams, reference numeral 101 denotes a control station (AP), reference numeral 102 denotes a first control station (STA1), reference numeral 103 denotes a second control station (STA2), reference numeral 104 denotes a cable LAN connected to the control station 101, and reference numeral 105 denotes a BSS (Basic Service Set) set up by the control station 101, and basically is operated in infrastructure mode. With the descriptions hereafter, the first terminal station 102 has data to be transmitted to the second terminal station 103.

Note that in FIG. 1, for simplification of description, one control station and only one pair of terminal stations 102 and 103 serving as communication partners are contained in the BSS set up by the control station, but the essence of the present invention is not limited to this. One BSS may contain three or more terminal stations, and the present invention is also applicable to cases of performing data communication with arbitrary pairings of the terminal stations. Also, the present invention is applicable in a system environment wherein two or more control stations exist and communication is performed between control stations (described later).

Figure 2:
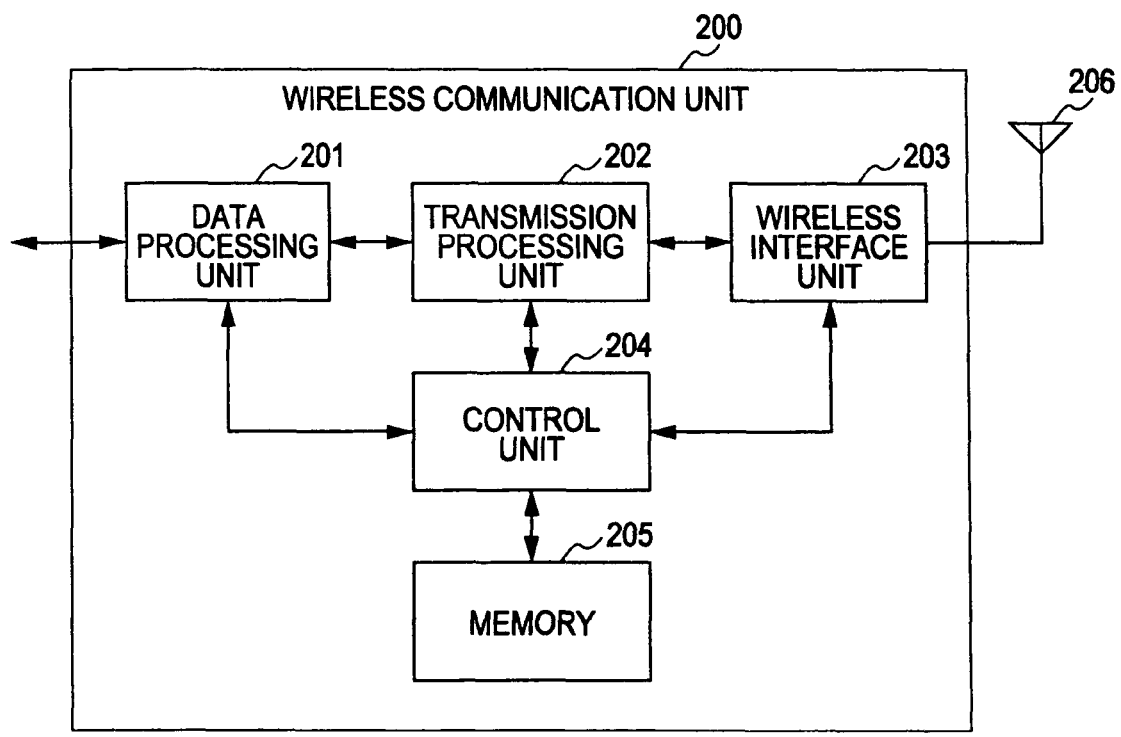
FIG. 2 is a schematic diagram of an internal configuration of a wireless communication device which can operate terminal stations 102 and 103 and FIG. 1.

FIG. 2 is a schematic diagram of an internal configuration of a wireless communication device 200 which can operate as terminal stations 102 and 103 and FIG. 1. As shown in the diagram, the wireless communication device 200 has a data processing unit 201, transmission processing unit 202, wireless interface unit 203, control unit 204, memory 205, and antenna 206.

The data processing unit 201 is a function module to perform processing in a heavy load transport layer, and creates a transmission packet in accordance with a data transmission request from an upper layer thereof.

The transmission processing unit 202 is a function module to perform processing primarily in a MAC layer, performs processing such as appending a header or error detection notations as to the packet generated by the data processing unit 201.

The wireless interface unit 203 is a function module to perform processing primarily in a PHY (physical) layer, and converts the data received from the transmission processing unit 202 to a modulation signal and transmits this to a wireless transmission path from the antenna 206.

Also, with the receiving operations, the signal received by the antenna 206 is subjected to demodulation processing by the wireless interface unit 203, and the transmission processing unit 202 performs analysis of the header. The data processing unit 201 then restores the original transmission data from the demodulated signal and transmits this to the upper layer.

Note that the wireless communication device operating as the control station 101 can be configured similar to that shown in FIG. 2, but detailed description thereof is omitted here.

The communication system shown in FIG. 1 is basically operated in infrastructure mode, and the control stations makes notifications with a beacon in predetermined cycles. Conversely, the terminal stations 102 and 103 recognize by receiving the beacons that the control station 101 exists nearby, and by further establishing a connection with the control station 101, enters the network as a BSS member.

Also, each terminal station 102 and 103 can switch to Power Save mode, and lower power consumption by performing receiving operations only intermittently. That is to say, the terminal stations 102 and 103 enter a sleep state (Doze) wherein the receiver power is dropped until a beacon-receiving point-in-time (TBTT) of the next beacon or the beacon multiple times in the future. Hereafter, let us say that the control station 101 knows the timing that each of the terminal stations 102 and 103 in Power Save mode will be Awake, but the terminal stations cannot know the waking state of one another.

In infrastructure mode, each of the terminal stations 102 and 103 under control of the control station 101 can be connected to a backbone network such as the Internet through a cable LAN 104. Also, in the event of transmitting data from the terminal station 102 to the terminal station 103, in order to eliminate overhead by the control station 101 relay, a direct link is set between the terminal stations while retaining infrastructure mode, and an arrangement for direction communication to directly send data without routing via a control station 101 is introduced.

However, even if a direct link is established between the terminal stations 102 and 103, if the communication partner is not in a location wherein sufficient waves can reach, and in a location wherein communication quality can be obtained, i.e. within range of direct link capability, throughput can be decreased. Thus, with the communication system according to the present embodiment, an arrangement is introduced to confirm whether or not there is the capability of direct communication with the communication partner, and starting direct communication between communication stations within the direct link range.

A particular feature of the present embodiment uses normal sending/receiving operations between the control station and terminal stations performed in infrastructure mode, to determine whether or not the communication partner desiring establishing of a direct link is within the direct link range. In such a case, the processing to confirm capability or not of direct communication with a communication partner can be performed with minimal load. Also, the wireless quality of the direct link is measure before establishing the direct link with the desired communication partner, whereby decreased throughput from performing direct communication with a communication partner unable to obtain sufficient communication quality can be avoided.

Figure 3:
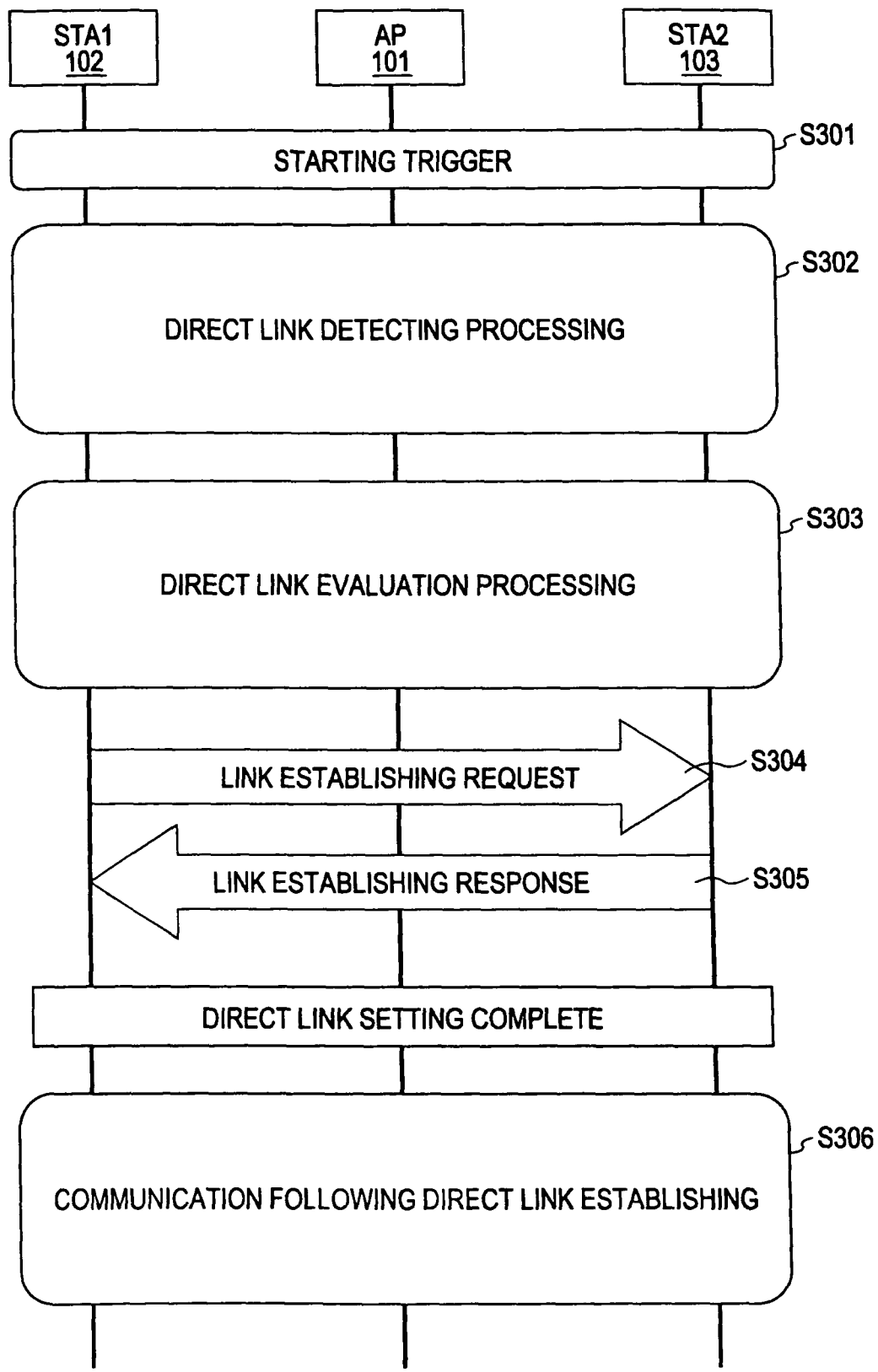
FIG. 3 is a diagram illustrating the process flow for a first terminal station 102, which is a data transmission source, to establish a direct link and perform direct communication as a main unit.
Figure 4:
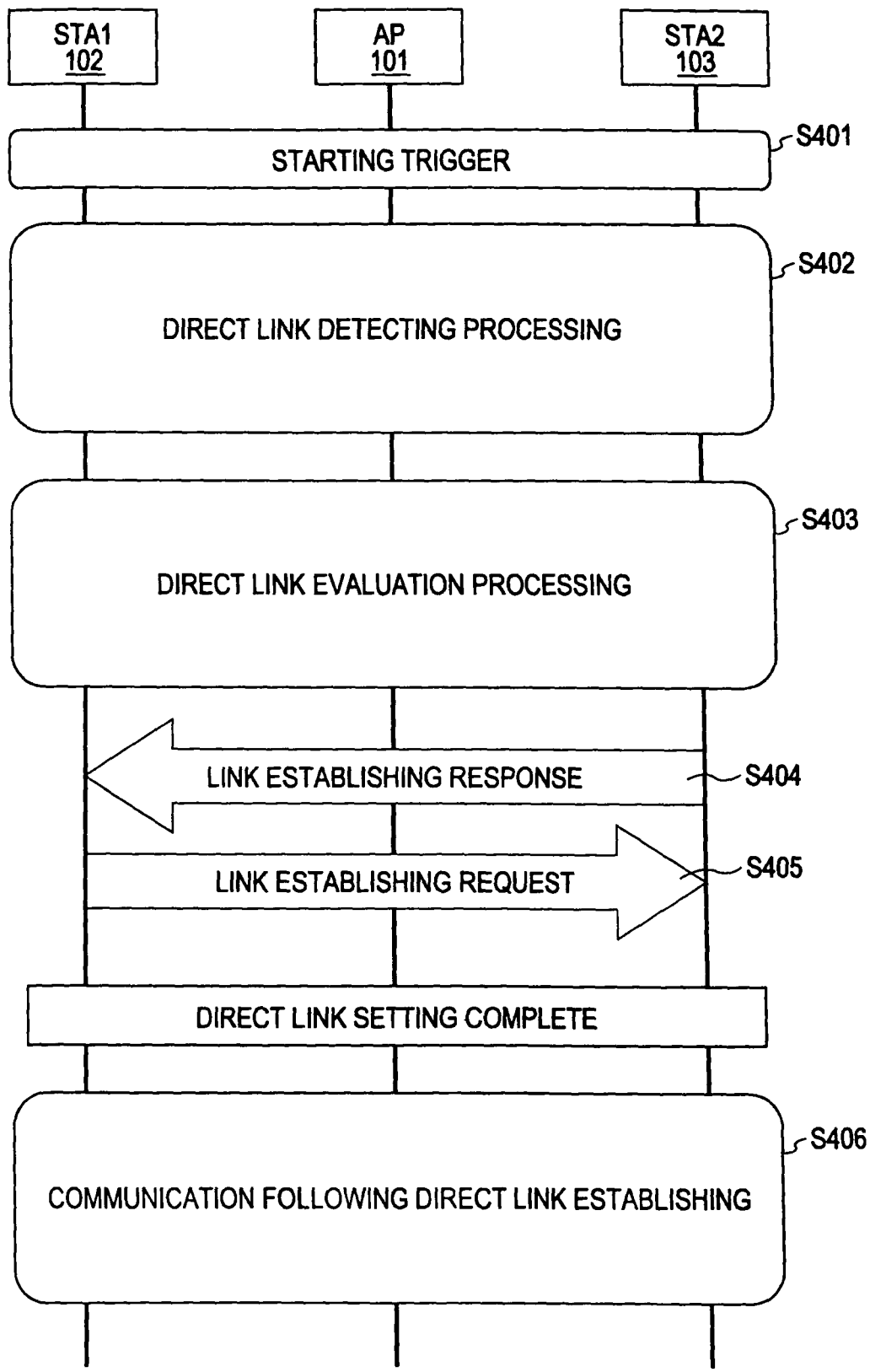
FIG. 4 is a diagram illustrating the process flow for a second terminal station 103, which is a data receiving destination, to establish a direct link and perform direct communication as a main unit.

FIGS. 3 and 4 show a process flow to establish a direct link between the first terminal station 102 and second terminal station 103 and perform direct communication without routing via the control station 101. FIG. 3 shows the case of starting establishing of a direct link wherein the first terminal station 102 serving as the data transmission source is the main unit, and FIG. 4 shows the case of starting establishing of a direct link wherein the first terminal station 103 serving as the data receiving destination is the main unit.

In either case of FIG. 3 or FIG. 4, direct communication is started after a process of five steps is completed up to link establishing (S306, S406), such steps being "start trigger (S301, S401)", "detect direct link (S302, S402)", "evaluate direct link (S303, S403)", "link establishing request (S304, S404)", and "response to link establishing request (S305, S405)". However, a system may be operated by executing processing for several steps concurrently.

The trigger starting (S301, S401) is processing wherein each terminal station 102 and 103 attempt to start link detecting operations from where normal wireless LAN operations are performed. The direct link detecting (S302, S402) is detecting operation as to whether or not one another are in a range capable of direct communication, i.e. within direct link range. With the present embodiment, direct link detecting (S302, S402) is performed by using normal sending/receiving operations between the control station 101 and terminal station 102 or 103 in infrastructure mode. The direct link evaluating (S303, S403) is an operation to evaluate the wireless quality of the link thereof, and confirm whether or not throughput will decrease if direct communication is performed with the communication partner. The link establishing request/response (S304, S404) is an operation for one terminal station to notify the communication partner of a clear desire for establishing a direct link with the partner and the response operation thereto.

First Embodiment

With the first embodiment, the first terminal station 102 serving as the data transmission source starts establishing a direct link according to the procedures shown in FIG. 3. Hereafter, in the embodiments, each process will be described from "start trigger", "detect direct link", "evaluate direct link", "link establishing request", and "response to link establishing request" up to establishing a link.

Start Trigger

The first terminal station 102 serving as the data transmission source uses the transmitting of the data (of the generating of a data transmission request at the upper layer) itself as a trigger for a direct link test. Also, in the case that the first terminal station 102 serving as a content server system or the like, the receiving of a packet for content obtaining request from the second terminal station 103 serving as the client may be used as a trigger for a direct link test. In the case that the trigger condition is satisfied, the data processing unit 201 in the first terminal station performs notification to the control unit 204, and starts direct link detecting processing S302.

Direct Link Detecting Processing

With the present embodiment, the direct link detecting S302 is performed by employing normal sending/receiving operations between the control station and terminal station performed in infrastructure mode, whereby this can be accomplished with minimal load.

FIG. 16 shows a state of transmitting a data frame from the first terminal station 102 to the second terminal station 103 while in infrastructure mode. As shown in the diagram, the first terminal station (STA1) 102 sends a data frame to the control station (AP) 101 with the relay destination being the second terminal station (STA2) 103.

The control station 101 receives a data frame and interprets the MAC (Machine Access Control) header, and upon the relay destination recognizing this as the second terminal station 103, corrects the content of the MAC header portion, and transfers the data frame to the second terminal station 103 address. When the second terminal station 103 is operating in Power Save mode, the control station 101 performs transfer of the data frame to match the timing that the second terminal station 103 switches to an Awake state.

Upon receiving the data frame, the second terminal station 103 returns a receiving confirmation Ack frame after a short frame space (SIFS: Short InterFrame Space). If the first terminal station 102 can receive the Ack frame replied by the second terminal station 103, the second terminal station 103 serving as the communication partner exists in a location where sufficient waves reach, i.e. a direct link can be detected.

FIG. 17A shows a format for the MAC header portion. The address for a nearby frame transmission destination is written in the Address1 field in this header, the address for a frame of the transmission source is written in the Address2 field, and the address for a relay destination or relay source of a frame is written in the Address3 field. Accordingly, as shown in FIG. 16, (Address1, Address2, Address3)=(AP, STA1, STA2) is written in the MAC header region of the data frame sent from the first terminal station 102 to the control station 101. Also, (Address1, Address2, Address3)=(STA2, AP, STA1) is written in the data frame transferred from the control station 101 to the second terminal station 103. On the other hand, FIG. 17B shows a format for an Ack frame, but as shown in the diagram, only a frame receiving destination address RA (Receiver Address) is written in the Ack frame, so even if the Ack frame is received, the transmission source node thereof cannot be specified. Thus, upon receiving the data frame wherein (Address1, Address2, Address3=(STA2, AP, STA1) is written, the first terminal station 102 attempts reception of the Ack frame after SIFS is exceeded, whereby detecting of a direct link between the second terminal station 103 can be performed.

Thus the first terminal station 102 needs to await receiving of the normal Ack frame replied from the second terminal station 103. In other words, detecting processing can be performed for a direct link without using a dedicated packet, so processing load of the overall system can be reduced.

Figure 5:
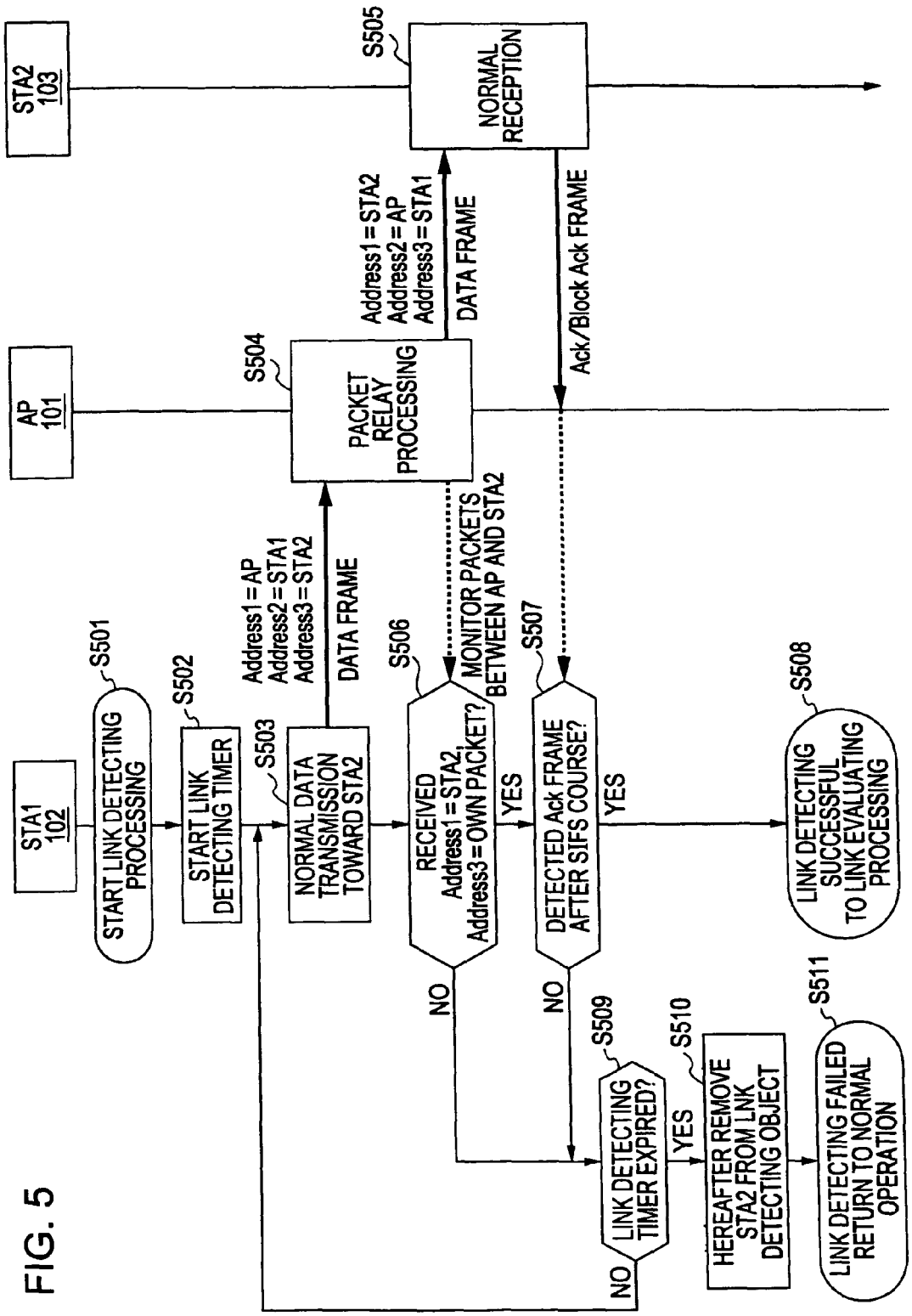
FIG. 5 is a diagram illustrating detailed procedures for direct link detecting processing according to a first embodiment.

FIG. 5 is a diagram illustrating detailed procedures for direct link detecting processing according to the first embodiment. Upon the direct link detecting processing starting (step S501), the first terminal station 102 starts a link detecting timer (step S502), and hereafter until the timer is ended, the following processing is performed each time a data frame addressed to the second terminal station 103 is sent (step S503).

The data frame sent from the first terminal station 102 is relayed by the control station 101 (step S504), and arrives at the second terminal station 103 (step S505). When the second terminal station 103 is operating in Power Save mode, the control station 101 transfers the data frame to match the timing of the second terminal station 103 switching to an Awake state.

The first terminal station 102 monitors the packet after the data frame is relayed (step S506). The transmission processing unit 202 in the first terminal station 102 detects "Address1 field=STA2, Address3 field=STA1 in MAC header region", whereby determination can be made that this is a packet after relay. Upon detecting this relay packet (Yes in step S506), when the SIFS has passed after packet reception, the first terminal station 102 monitors whether or not an Ack or Block Ack frame which is likely transmitted by the second terminal station 103 can be detected (step S507).

If the Ack or Block Ack can be detected (Yes in step S507), the transfer processing unit 202 in the first terminal station 102 determines that the second terminal station 103 is within direct link range, and switches to direct link evaluation processing which is to follow (step S508).

On the other hand, if detecting of an Ack or Block Ack frame cannot be detected by the end of the timer (No in step S509), the transfer processing unit 202 in the first terminal station 102 determines that the second terminal station 103 is outside direct link range, or is a node connected to a cable LAN, and notifies this to the control unit 204. The control unit 204 saves the address of the second terminal station 103 in the memory 205, and excludes the address of the second terminal station 103 from the transmission processing unit 202 from the next time and thereafter (step S510). Then interpreting this as a failure of direct link detecting processing, the flow is returned to the normal operations in infrastructure mode (step S511).

Direct Link Evaluating Processing

Upon detecting with the direct link detecting processing that the second terminal station 103 serving as a communication partner is in a location where sufficient waves can reach, the first terminal station 102 confirms whether or not the second terminal station 103 is in a location to obtain favorable communication quality. By measuring the wireless quality of the direct link before establishing the direct link with the desired communication partner, decreased throughput due to direct communication with a communication partner wherein sufficient communication quality is not obtained can be avoided.

FIGS. 6A and 6B show detailed procedures for direct link evaluating processing according to the first embodiment. The first terminal station 102 sends a direct Link Test Request packet for requesting the start of direct link evaluating processing to the second terminal station 103 via the control station 101 (S602). Specifically, within the first terminal station 102, a frame is generated at the data processing unit 201 by instruction from the control unit 204, and is transmitted from the antenna 206 via the transfer processing unit 202 and wireless interface unit 203.

With the IEEE 802.11n-D1.0 which is an extended specification of IEEE 802.11a/g, a QoS Null Embedding Management Action is defined for propagating a Management Action Body. By using the QoS Null Embedding Management Action, the above-mentioned Direct Link Test Request can be encapsulated in a data-type frame, and sent in a format of an IEEE 802.11 management frame. The management frame in QoS Null lists information of the transmission rate supported by the second terminal station 103, information about corresponding functions, and the number of test packets to be sent.

The QoS Null frame is not transmitted by communication with the control station. Accordingly, the first terminal station 102 sends the request packet employing the QoS Null frame without knowing whether the second terminal station 103 is a wireless node or a cable node, whereby even if the second terminal station 103 is a cable node, there is the advantage that an unnecessary packet is prevented in advance from flowing to the cable LAN 104 side beyond the control station 101.

The control station 101 transfers the Test Request packet when the second terminal station 103 is in the Awake state (step S603). Upon the second terminal station 103 receiving the Test Request packet (step S604) via the control station 101, the control unit 204 thereof determines from the communication state whether itself is in a testable state (step S605). The capability determination results are sent as a Direct Link Test Confirm pack via the control station 101 (step S606). The control station 101 transfers the Test Confirm packet to match the timing of the first terminal station 102 switching to an Awake state (step S607).

Information of the supporting transmission rate at the second terminal station 103 and information of corresponding functions are written in the Direct Link Test Confirm packet. Also, statistical information about the wireless link between the control station 101 and second terminal station 103 may also be written together in the Test Confirm packet. By sending the confirmation response packet employing the above-described QoS Null Embedding Management Action, this can be encapsulated in a data-type frame and sent in the IEEE 802.11 management format, as well as preventing outflow to the cable LAN 104.

If the Test Confirm packet can be received (Yes in step S608), the first terminal station 102 analyzes the content of the packet and confirms whether or not the second terminal station 103 is in a state capable of testing the link (step S609).

At this time, if the second terminal station is in a testable state (Yes in step S609), following this, the first terminal station 102 employs the transmission rate supported by the second terminal station 103 to directly transfer multiple test packets as to the second terminal station 103 without routing via the control station 101 (step S613).

On the other hand, if the Test Confirm packet from the second terminal station 103 cannot be received (No in step S608), the first terminal station 102 determines that the communication partner is not handling the autonomous direct link setup (DLS) function of the present invention, notifies this to the control unit 204, and returns the flow to normal operations in infrastructure mode (step S622). In this case, the control unit 204 saves the address of the second terminal station 103 in the memory 205, whereby the address of the second terminal station 103 is excluded from direct link detecting with the transmission processing unit 202 from the next time and thereafter (step S621).

Also, in the case that the Test Confirm packet from the second terminal station 103 can be received (Yes in step S608) but receives a reply of "not testable" (No in step S609), this is notified to the control unit 204, and the flow is returned to normal operations in infrastructure mode (step S622). However, in this case the second terminal station 103 is not excluded from being subjected to direct link detecting.

On the other hand, if the reply is Confirm for testable in step S606 (Yes in step S610), the second terminal station 103 starts the link test timer, and hereafter maintains an Awake state without entering Sleep (Doze) state until the test is ended (step S611).

Then either the link test timer expires (Yes in step S623), or the second terminal station 103 receives the data frame of MoreData=0 which shows that this is the last test packet from the first terminal station 102 (Yes in step S614), continues to await reception until the end of the test, and records the number of test packets receives and the receiving power and the like (step S612). When the value of the MoreData flag is 1, this indicates additional data to be sent, and when the value thereof is 0, this indicates the last transmission data.

Following this, upon the receiving awaiting, i.e. the test ending (step S615), the second terminal station 103 sends the aggregated information as a Direct Link Test Report packet (step S616). This Test Report packet is delivered to the first terminal station 102 via the control station 101 (step S617). Statistical information about the wireless link between the control station 101 and second terminal station 103 may also be written together in the Test Report packet.

When the Test Report can be received (Yes in step S618), the first terminal station 102 determines at the control unit 204 whether or not to perform a link establishing request (step S619). In the case that information about the wireless link between the control station 101 and second terminal station 103 are written in the Test Confirm packet or Test Report packet, the first terminal station 102 can compare the link performance of the direct link and via the control station 101 to determine comprehensively whether or not to perform a link establishing request.

If control unit 204 of the first terminal station 102 determines that the second terminal station 103 is a partner sufficient to communicate with a direct link (Yes in step S619), the flow is advanced to the direct link establishing request 5304 (step S620).

Also, in a case that the second terminal station 103 is not determined to be a partner sufficient to communicate with a direct link (No in step S619), the control unit 204 saves the address of the second terminal station 103 in the memory 205 (step S621), and returns the flow to the normal operating state in infrastructure mode (step S622). The address of the second terminal station 103 is saved in the memory 205, so is excluded from the link detecting at the transfer processing unit 202 from the next time and thereafter.

Also, if the Test Report packet cannot be received (No in step S618), the first terminal station 102 stops attempting data communication with a direct link with the second terminal station 103, notifies this to the control unit 204, and the flow is returned to normal operations in infrastructure mode (step S622). However, in this case the second terminal station 103 is not excluded from direct link detecting thereafter.

Note that IEEE 802.11n which is an extended specification of IEEE 802.11a/g employs MIMO (Multiple Input Multiple Output) communication. MIMO is a communication method using spatial multiplexing for multiple transfer streams formed with a combination of multiple sending/receiving antennas, based on channel properties. With IEEE 802.11n-D1.0, a Transmit Beamforming function is defined, a packet including a training series for exciting a channel matrix from the other terminal, and at the other terminals a channel matrix is created using the training series received with each antenna, to calculate a weighting matrix for spatial multiplexing or spatial separation from the antenna matrix. In the case that both of the first terminal station 102 and second terminal station 103 have a Transmit Beamforming function, the first terminal station 102 can use the Transmit Beamforming for sending the test packet in the above-mentioned step S613. Thus, transmission quality of the direct link can be further improved.

Direct Link Establishing Request/Response

Upon confirmation made via the direct link evaluating processing that throughput does not decrease even if direct communication is performed with a communication partner, the terminal stations notify one another with link establishing request/response of the clear desire thereof to establish direct link therebetween.

Figure 7:
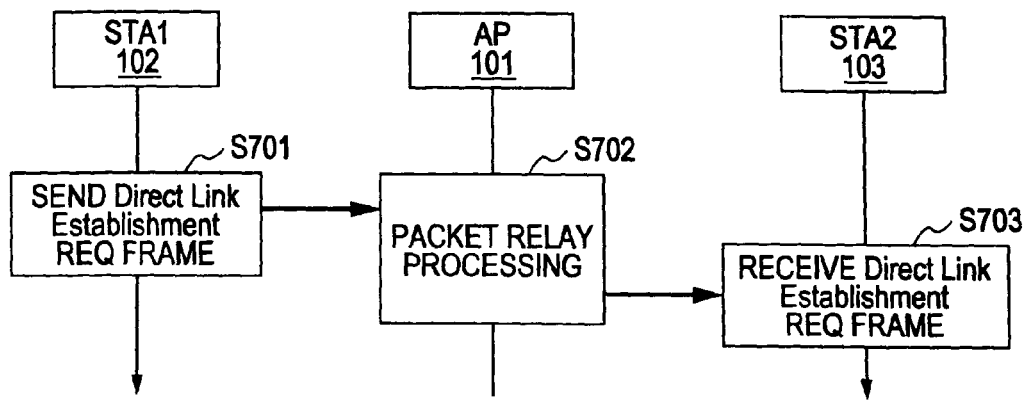
FIG. 7 is a diagram illustrating procedures for direct link establishing request processing according to the first embodiment.
Figure 8:
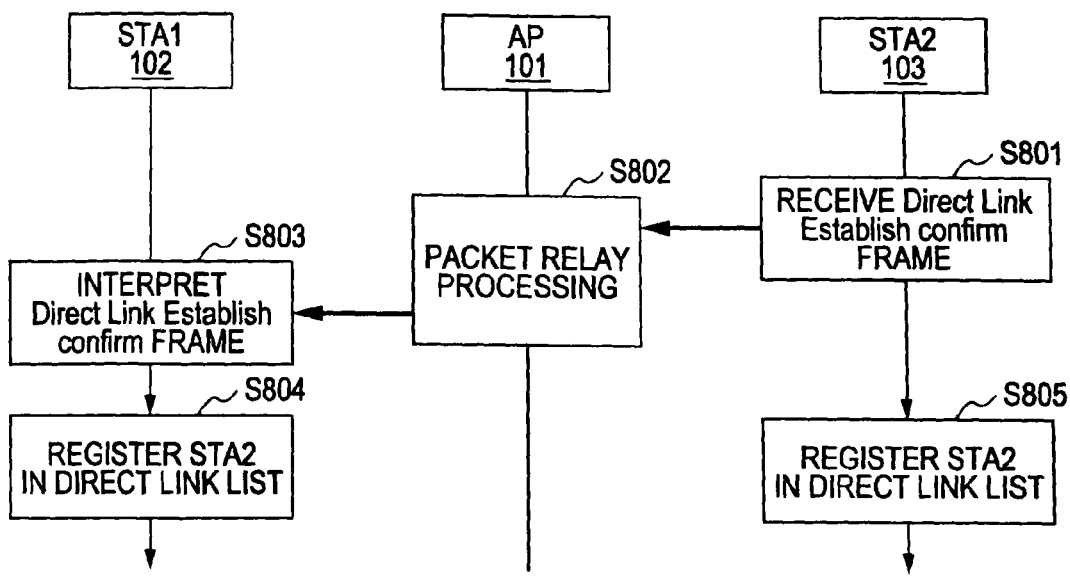
FIG. 8 is a diagram illustrating procedures for response processing as to the direct link establishing request according to the first embodiment.

FIGS. 7 and 8 show the procedures for direct link establishing request processing according to the first embodiment and the response processing thereto in flowchart format. However, let us say that in each diagram, the first terminal station 102 serving as the data transmission source performs the direct link establishing request.

With the request process, the first terminal station 102 sends a Direct Link Establishment Request packet as to the second terminal station 103 via the control station 101 (step S701). This packet is encapsulated with the QoS Null Management Action (described above) and sent.

The second terminal station 103 can perform receiving operations only intermittently in Power Save mode. The control station 101 knows the timing for each of the terminal stations 102 and 103 in Power Save mode to Wake, so matching this to the waking state of the second terminal station 103, the control station 101 transfers the Direct Link Establishment Request packet (step S702).

Upon receiving the control station Establishment Request packet (step S703), the second terminal station 102 sends a Direct Link Establishment Confirm packet as an Acknowledgement thereto (S801).

The first terminal station 102 can perform receiving operations only intermittently in Power Save mode. The control station 101 knows the timing for each of the terminal stations 102 and 103 in Power Save mode to Wake, so matching this to the waking state of the first terminal station 102, the control station 101 transfers the Direct Link Establishment Request packet (step S802), and the first terminal station 102 receives the packet (step S803). However, if the first terminal station 102 sending the Request is to remain Awake until receiving a Confirm, step S801 is replaced with a direct transmission, and step S802 can be omitted to reduce overhead.

Following this, the control units 204 for each of the terminal stations 102 and 103 add the partner to the direct link list in the memory 205 (steps S804, S805), whereby establishment of a direct link between the first terminal station 102 and second terminal station 103 is completed. Hereafter the communication to the partner employs a direct link instead of routing via the control station 101.

Communication Following Direct Link Establishment

Following the direct link established between the first terminal station 102 serving as the data transmission source and the second terminal station 103 serving as the data receiving destination, in accordance with the processing procedures shown in FIGS. 7 and 8, the relay by the control station 101 is omitted, whereby direction communication is enabled between terminal stations.

FIG. 9 shows processing procedures for performing communication between the first terminal station 102 and the second terminal station 103 following direct link establishing according to the first embodiment.

If the data transmission will not be affected by a delay, the respective power stations can carry out operations in Power Save mode, even after a direct link is established between the first terminal station 102 and second terminal station 103.

Upon data generated to be directly transferred as to the second terminal station 103, when the first terminal station 102 enters the Awake state, the first terminal station 102 sends a Direct Link Wakeup Request packet to the second terminal station 103 via the control station 101 (step S901).

The second terminal station 103 may perform receiving operations only intermittently in Power Save mode. The control station 101 transfers the Direct Link Wakeup Request packet to match the timing wherein the second terminal station 103 switches from the Doze state to the Awake state (step S902). Even while the second terminal station 103 is in the Doze state, the Wakeup Request is sent from the control station 101, thereby reaching the second terminal station 103 in a secure manner.

Upon receiving the Direct Link Wakeup Request packet, the second terminal station 103 sends the Direct Link Wakeup Confirm packet which is a confirmation response thereto, via the control station 101 (step S903). Following transmission of this packet, the second terminal station 103 maintains the Awake state for a predetermined amount of time, in accordance with the direct communication with the first terminal station 102.

The first terminal station 102 may perform receiving operations only intermittently in Power Save mode. The control station 101 transfers the Direct Link Wakeup Request packet to match the timing wherein the first terminal station 102 switches from the Doze state to the Awake state (step S904). Even while the first terminal station 102 is in the Doze state, the Wakeup Request is sent from the control station 101, thereby reaching the first terminal station 102 in a secure manner. However, if the first terminal station 102 sending the Request is to remain Awake until receiving a Confirm, step S903 is replaced with a direct transmission, and step S904 can be omitted to reduce overhead.

The first terminal station 102 waits for reception of the Direct Link Wakeup Confirm packet from the second terminal station 103, following which direct transmission of the data packet is started (step S905).

Upon sending the Direct Link Wakeup Confirm packet, the fixed-time Awake is maintained, whereby the second terminal station 103 can receive the data packet from the first terminal station 102 during an Awake state in a secure manner.

After this, the second terminal station 103 switches to the Doze state in accordance with MoreData bit=0 of the data frame received from the first terminal station 102. Thus, the terminal station can perform Power Save operations while a direct link is established with operation procedures similar to the normal IEEE 802.11.

As shown in FIG. 9, when the first terminal station 102 is to start direct link communication, a request to that effect is transferred to the second terminal station 103 via the control station 101. The control station 101 manages the waking state for each terminal station contained in the BSS in an integrated manner, whereby a request for direct link communication and a confirmation response thereto at a timing wherein each terminal station is in the Awake state, can be transferred to each terminal station. In other words, even after the direct link is established, each terminal station can be switched to Power Save mode, and the terminals stations can start direct communications with the communication partner without recognizing the waking state of one another.

Also, in the event of performing processing procedures shown in FIGS. 5 through 9, it must be made clear that a dedicated function such as a DLP is not necessary on the control station 101 side. That is to say, direct communication capability between terminal stations performing data transmission with one another is favorably confirmed, and sets a direct link with the communication partner which does not lead to decreased throughput.

Second Embodiment

With the second embodiment also, the first terminal station 102 serving as the data transmission source starts establishing a direct link according to the procedures shown in FIG. 3, as a main unit. The starting trigger thereof is similar to that in the first embodiment. However, the second embodiment differs from the first embodiment in that the direct link detecting processing and direct link evaluating processing are simultaneously executed.

FIGS. 10A and 10B show the processing procedures for simultaneously executing direct link detecting processing and direct link evaluating processing according to the second embodiment.

The first terminal station 102 sends a Direct Test Request packet for requesting the start of the direct link evaluating processing to the second terminal station 103 via the control station 101 (S1002). The Direct Link Test Request is encapsulated in the data-type frame, and can be sent in the same format as the managing frame of IEEE 802.11 (same as above).

The control station 101 transfers the Test Request packet when the second terminal station 103 is in the Awake state (step S1003). Upon receiving the Test Request packet via the control station 101 (step S1004), the second terminal station 103 determines from the communication state as to whether the control unit 204 is itself in a testable state (step S1005). The capability determination results are then sent as a Direct Link Test Confirm packet via the control station 101 (step S1006). The control station 101 transfers the Test Confirm packet to match the timing wherein the first terminals station 102 switches to an Awake state (step S1007).

Information of the transmission rate supported by the second terminal station 103 and information about corresponding functions are written in the Direct Link Test Confirm packet. Also, statistical information about the wireless link between the control station 101 and second terminals station 103 may also be written together in the Test Confirm packet. The Direct Link Test Confirm also can be encapsulated in a data-type frame and sent in a management frame format of IEEE 802.11 by employing the above-described QoS Null Embedding Management Action (same as above).

If the Test Confirm packet can be received (Yes in step S1008), the first terminal station 102 analyzes the content of the packet to confirm whether or not the second terminal station 103 is testable for a direct link (step S1009).

If the second terminal station 103 is testable (Yes in step S1009), the first terminal station 102 employs the transmission rate supported by the second terminal station 103 to directly send multiple test packets as to the second terminal station 103 via the control station 101 (step S1013).

At this point in time, a direct link is not yet established, but if the test packet arrives (step S1012), the second terminal station 103 replies with an Ack frame with SIFS spacing. Thus, the first terminals station 102 uses the reception of the Ack frame to perform evaluating processing of the direct link simultaneously as the detecting operation of the direct link. Specifically, with the above-mentioned step S1013, each time a test packet is sent, the first terminal station 102 records the number of Ack frames received from the second terminal station 103 and the receiving power thereof. Upon ending the transmission of the test packet, the first terminal station 102 computes the packet error rate (PER) from the number of received Acks (step S1014). Following this, the first terminal station 102 determines whether or not the wireless quality of the direct link is sufficient or not, based on the information of the PER and receiving power (step S1015).

Upon the control unit 204 in the first terminal station 102 determining that the second terminal station 103 is a partner which can communicate with a direct link (Yes in step S1015), the flow is advanced to the direct link establishing request S304 (step S1016).

On the other hand, in the case that the second terminal station 103 is not determined to be a partner which can communicate with a direct link (No in step S1015), the control unit 204 saves the address of the second terminal station 103 in the memory 205 (step S1017), and the flow is returned to the normal operation state in infrastructure mode (step S1018). The address of the second terminal station 103 is saved in the memory 205, so is excluded from link detecting with the transfer processing unit 202 from the next time and thereafter.

Note that in the case that both the first terminal station 102 and second terminal station 103 have a Transmit Beamforming function defined in the IEEE 802.11n-D1.0, the first terminal station 102 may use Transmit Beamforming to send the test packets in the above-mentioned step S1013. Thus, transmission quality of the direct link can be further improved (same as above).

With the present embodiment, unlike with the first embodiment, information about the receiving power at the first terminal station 102 side and the information about the wireless link between the control station 101 and second terminals station 103 cannot be obtained, and carries the risk of sending a test packet even in a state wherein a link cannot be detected. However, there is the advantage wherein, compared to the first embodiment, the load of the second terminals station can be reduced and processing simplified in the event of performing direct link detecting and evaluation performing.

Thus, after a successful conclusion of the direct link detecting processing and direct link evaluating processing, similar to the first embodiment, a direct link is established between the first terminal station 102 serving as the data transmission source and the second terminal station 103 serving as the data reception destination in accordance with the processing procedures shown in FIGS. 7 and 8, and also direct communication can be performed in accordance with the processing procedures shown in FIG. 9.

Third Embodiment

With the third embodiment also, the first terminal station 102 serving as the data transmission source starts establishing a direct link according to the procedures shown in FIG. 3, as a main unit. The starting trigger thereof and the direct link detecting processing are similar to that in the first embodiment. However, the third embodiment differs from the first embodiment in that the direct link establishing processing and direct link evaluating processing are simultaneously executed.

FIGS. 11A and 11B show the processing procedures for simultaneously executing direct link evaluating processing and direct link establishing processing.

The first terminal station 102 sends a Direct Link Test & Establishment Request packet addressed to the second terminal station by relay of the control station 101 (S1102). The control station 101 transfers the Direct Link Test & Establishment Request packet when the second terminal station 103 is in the Awake state (step S1103).

The Direct Link Test & Establishment Request packet includes a Direct Link Establishment Request packet which notifies the desire for a link establishment request in addition to the Test Request which is a test request as to the second terminal station 103. The statistical information about the wireless link between the first terminal station 102 and control station 101 can be written together in the Direct Link Test & Establishment Request packet.

With the present embodiment, determination can be made as to whether the second terminal station 103 responds to the link establishment. That is to say, upon receiving the Direct Link Test & Establishment Request packet via the control station 101 (step S1104), the second terminal station 103 determines whether the control unit 204 is itself in a testable state, and whether the control unit 204 is according to the link establishment, from the communication state thereof (step S1105). The capability determination results are then sent as a Direct Link Test Confirm packet by relay with the control station 101 (step S1106). The control unit 101 transfers the Test Confirm packet to match the timing wherein the first terminal station 102 switches to an Awake state (step S1107).

Information of the transmission rate supported by the second terminal station 103 and information about corresponding functions thereto are written in the Direct Link Test Confirm packet. Also, statistical information about the wireless link between the control station 101 and second terminal station 103 may also be written together in the Test Confirm packet. By sending the confirmation response packet employing the above-described QoS Null Embedding Management Action defined by IEEE 802.11n-D1.0, this can be encapsulated in a data-type frame and sent in the IEEE 802.11 management format, as well as preventing outflow to the cable LAN 104.

If the Test Confirm packet can be received (Yes in step S1108), the first terminal station 102 analyzes the content of the packet and confirms whether or not the second terminal station 103 is in a state capable of testing the link (step S1109) and responds to the link establishment.

At this time, if the second terminal station 103 is in a testable state (Yes in step S1109) and responds to the link establishment, following this, the first terminal station 102 employs the transmission rate supported by the second terminal station 103 to directly send multiple test packets as to the second terminal station 103 without routing via the control station 101 (step S1113).

On the other hand, if the Test Confirm packet from the second terminal station 103 cannot be received (No in step S1108), the first terminal station 102 determines that the communication partner is not handling the autonomous direct link setup (DLS) function of the present invention, notifies this to the control unit 204, and returns the flow to normal operations in infrastructure mode (step S1125). Alternatively, in the case that the response from the second terminal station 103 is "link cannot be established" (No in step S1109), determination is made that sufficient communication quality cannot be obtained from a direct link with a partner as compared to communication by control station relay, this is notified to the control unit 204, and the flow is returned to normal mode in infrastructure mode (step S1125). In this case, the control unit 204 saves the address of the second terminal station 103 in the memory 205, whereby the address of the second terminal station 103 is excluded from direct link detecting with the transmission processing unit 202 from the next time and thereafter (step S1124).

Also, in the case that the Test Confirm packet from the second terminal station 103 can be received (Yes in step S1108) but receives a reply of "not testable", the first terminal station 102 notifies this to the control unit 204, and the flow is returned to normal operations in infrastructure mode (step S1125). However, in this case the second terminal station 103 is not necessarily not corresponding to autonomous DLS function, so is not excluded from being subjected to direct link detecting.

On the other hand, upon replying with Confirm for being testable and link establishing allowing of step S606 (Yes in step S1110), the second terminal station 103 starts the link test timer, and does not enter the Sleep (Doze) state hereafter until the test is ended, but maintains the Awake state (step S1111).

Then either the link test timer expires (Yes in step S1126), or the second terminal station 103 receives the data frame of MoreData=0 which shows that this is the last test packet from the first terminal station 102 (Yes in step S1114), continues to await reception until the end of the test, and records the number of test packets received and the receiving power and the like (step S1112).

Following this, upon ending awaiting of reception (step S615), the second terminal station 103 computes the packet error rate (PER), and determines whether or not the wireless quality of the direct link is sufficient or not, together with the test packet receiving power information, from the control unit 204 (step S1116). If the Test & Establishment Request packet includes information about the wireless link between the first terminal station 102 and control station 101, the second terminal station 103 can make a comprehensive determination as compared to the direct link performance with the case of routing via the control station 101.

The second terminal station 103 sends a Direct link Establishment Confirm packet addressed to the first terminal station 102 with the determination results to the control station 101 (step S1117). The control station 101 transfers the packet to match the timing of the first terminal station 102 switching to an Awake state (step S1118).

Unlike the first embodiment, the second terminal station 103 does not simply reply the test results of the wireless link as a Test Report, but determines whether the wireless quality of the direct link is sufficient, and replies with an Establishment Confirm serving as a determination result.

Upon receiving the Direct link Establishment Confirm packet from the control station 101 (step S1119), the first terminal station 102 interprets the direct link establishment capability determination results written in the packet thereof (step S1120).

In the case determination is made by the second wireless terminals that a direct link may be established according to the wireless link quality (Yes in steps S1120 and S1122), the control unit 204 within each terminal station 102 and 103 adds the partner to the direct link list in the memory 205 (step S1121, S1123), and thereafter uses a direct link for communication to the partner. Thus, the establishment of a direct link between the first terminal station 102 and the second terminal station 103 is completed.

On the other hand, in the case determination is not made by the second wireless terminals that a direct link may be established according to the wireless link quality (No in steps S1120 and S1122), the control unit 204 within the terminal station 102 saves the address of the second terminal station 103 in the memory 205 (step S1124), and the flow is returned to normal operational state in infrastructure mode (step S1125). The address of the second terminal station 103 is saved in the memory 205, so the address of the second terminal station 103 is excluded from link detecting with the transmission processing unit 202 from the next time and thereafter.

Note that in the case both the first terminal station 102 and the second terminal station 103 have a Transmit Beamforming function defined by IEEE 802.11n-D1.0, the first terminal station 102 may use the Transmit Beamforming can be used to send the test packet. Thus, transmission quality of the direct link can be further improved (same as above).

With the present embodiment, there is an advantage wherein, by deferring the link establishing capability determination to the second terminal station 103 serving as the data receiving destination, the establishing request/response processing can be included in the evaluating processing and thus simplified as compared to the first embodiment.

Thus, the evaluating processing of the direct link comes to a successful conclusion, and after the direct link establishing request/response, and the direct link is established between the first terminal station 102 serving as the data transmission source and the second terminal station 103 serving as the data receiving destination, direct communication can be performed according to the processing procedures shown in FIG. 9, similar to the first embodiment.

Fourth Embodiment

In the fourth embodiment also, the first terminal station 102 serving as the data transmission source starts establishing a direct link according to the procedures shown in FIG. 3, as a main unit. The starting trigger thereof and the direct link detecting processing are similar to that in the first embodiment. However, the fourth embodiment differs from the first embodiment in that the test packet is sent from the second terminal station 103 side serving as the data receiving destination, and direct link establishing is performed with the first terminal station 102 serving as the data transmission source.

Figure 12A:
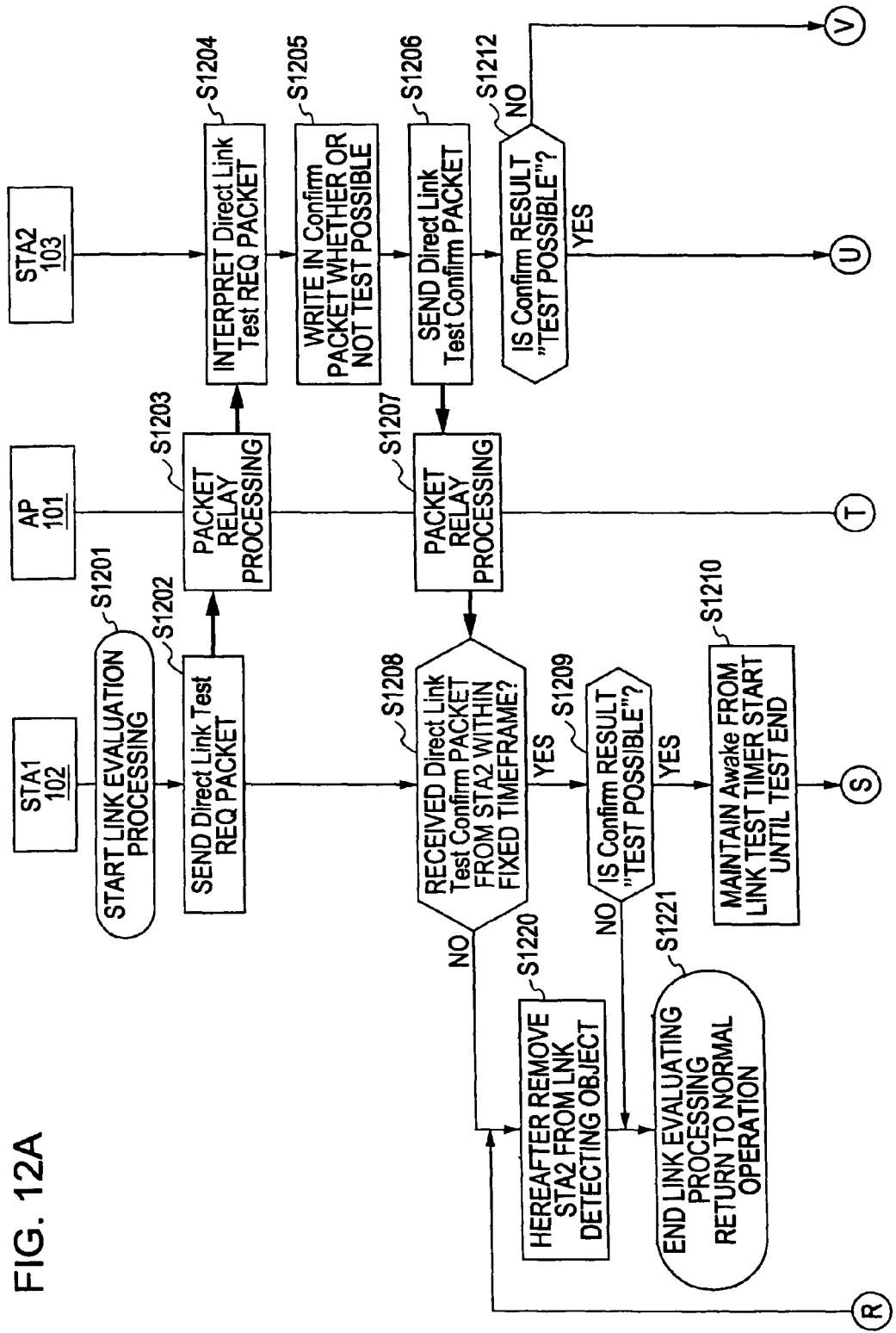
FIG. 12A illustrates procedures for direct link evaluating processing according to a fourth embodiment.
Figure 12B:
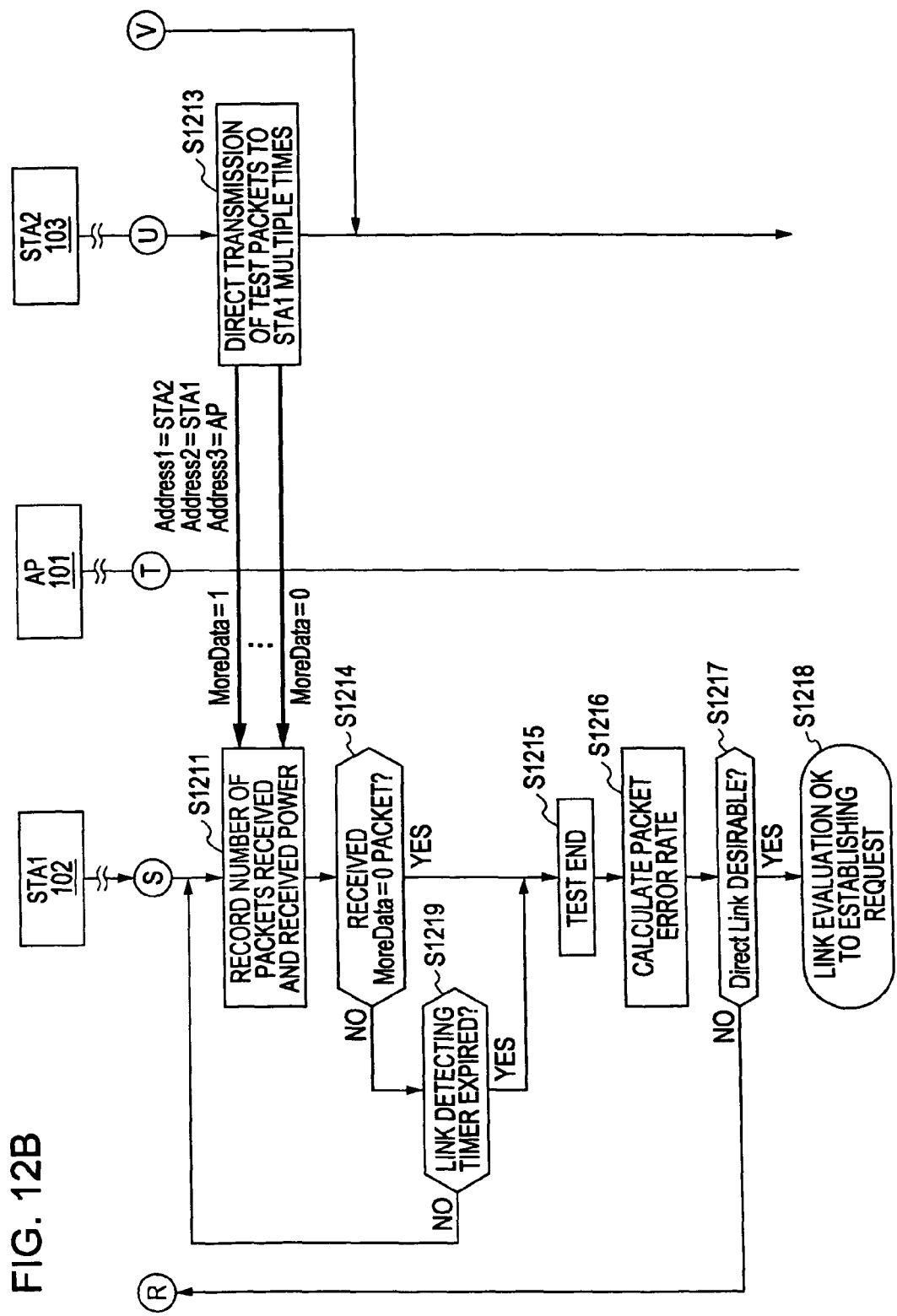
FIG. 12B illustrates procedures for direct link evaluating processing according to the fourth embodiment.

FIGS. 12A and 12B show procedures for direct link evaluating processing according to the present example. With the evaluating processing, first, the first terminal station 102 sends the Direct Link Test Request packet addressed to the second terminal station 103 by relay with the control station 101 (step S1202). Specifically, within the first terminal station 102, the frame generated with the data processing unit 201 by instructions from the control unit 204 is sent from the antenna 206 via the transmission processing unit 202 and wireless interface unit 203. The control station 101 then transfers the Direct Link Test Request packet when the second terminal station 103 is in an Awake state (step S1203).

By sending the Direct Link Test Request packet employing the QoS Null Embedding Management Action defined by IEEE 802.11n-D1.0, this can be encapsulated in a data-type frame and sent in the IEEE 802.11 management format, as well as preventing outflow to the cable LAN 104. Information about the transmission rate supported by the first terminal station 102 and corresponding function information is written in the management frame in QoS Null.

Upon receiving the Direct Link Test Request packet (step S1204), the control unit 204 in the second terminal station 103 determines from the communication state whether itself is in a testable state, generates the Direct Link Test Confirm packet including such capability or not (step S1205), and relaying through the control station 101, sends this to the first terminal station 102 address (S1206). The control station 101 transfers the Direct Link Test Confirm packet when the first terminal station 102 is in the Awake state (step S1207).

The Direct Link Test Confirm packet is also sent using the QoS Null Embedding Management Action. The Direct Link Test Confirm packet includes information about the transmission rate supported by the second terminal station 103 and corresponding function information. Also, in the case of indicating that testing is possible with this packet, the number of test packets to be sent is also included and sent. Also, statistical information about the wireless link between the second terminal station 103 and control station 101 is written together in the Direct Link Test Confirm packet.

Upon receiving Direct Link Test Confirm from the second terminal station 103 (Yes in step S1208), the first terminal station 102 confirms whether or not the second terminal station 103 is capable of a link test, based on the content in the packet (step S1209).

At this time, if the second terminal station 103 is in a testable state (Yes in step S1209), the first terminal station 102 starts the link test timer, and thereafter until the test is ended, maintains an Awake state without entering Sleep (step S1210), and awaits reception of the packet (step S1211).

On the other hand, in the case that Direct Link Test Confirm packet cannot be received from the second terminal station 103 (No in step S1208), the first terminal station 102 determines that the communication partner is not handling the autonomous direct link setup (DLS) function of the present invention, notifies this to the control unit 204, and returns the flow to normal operations in infrastructure mode (step S1221). In this case, the control unit 204 saves the address of the second terminal station 103 to the memory 205, and excludes the address of the second terminal station 103 from the transmission processing unit 202 from the next time and thereafter (step S1220).

Also, in the case that the Direct Link Test Confirm packet from the second terminal station 103 can be received (Yes in step S1208) but receives a reply of "not testable" (No in step S1209), the first terminal station 102 notifies this to the control unit 204, and the flow is returned to normal operations. However, in this case the second terminal station 103 is not necessarily not corresponding to autonomous DLS function, so is not excluded from being subjected to direct link detecting.

In the case that the second terminal station 103 itself is testable (Yes in step S1212), the transmission rate supported by the second terminal station 103 is used to directly send multiple test packets as to the first terminal station 102 without going through the control station 101 (step S1213).

Note that in the case that both the first terminal station 102 and second terminal station 103 have a Transmit Beamforming function defined in the IEEE 802.11n-D1.0, the second terminal station 103 may use Transmit Beamforming to send the test packets in the above-mentioned step S1213. Thus, transmission quality of the direct link can be further improved (same as above).

Then either the link test timer expires (Yes in step S1219), or the first terminal station 102 awaiting reception of the test packet continues to await reception until the data frame of MoreData=0 which shows that this is the last test packet (Yes in step S1214) and records the number of test packets received and the receiving power and the like.

Upon ending the test (step S1215), the first terminal station 102 computes the packet error rate (PER) (step S1216) based on the number of test packets received and the number of test packets sent which is written in the Direct Link Test Confirm packet.

Next, the control unit 204 in the first terminal station evaluates the direct link based on the packet error rate and receiving power, and determines whether or not to perform a link establishing request as to the second terminal station 103 (step S1217). Also, if the information about the wireless link between the second terminal station 103 and control station 101 is written in the Direct Link Test Confirm packet received in step S1208, determination can be made comprehensively when comparing the case of relaying through control station and the link performance of the direct link.

Upon determining that the second terminal station 103 is a partner capable of communicating with a direct link (Yes in step S1217), the control unit 204 in the first terminal station 102 advances the flow to the direct link establishing request processing 5304 (step S1218).

On the other hand, in case the terminal station 103 is not determined to be a partner sufficient to communicate with a direct link, the control unit 204 in the first terminal station 102 saves the address of the second terminal station 103 in the memory 205 (step S1220), and returns the flow to the normal operating state in infrastructure mode (step S1221). The address of the second terminal station 103 is saved in the memory 205, so the address of the second terminal station 103 is excluded from the link detecting at the transfer processing unit 202 from the next time and thereafter.

Thus, after the evaluating processing of the direct link comes to a successful conclusion, similar to the first embodiment, after the direct link establishing request/response according to the processing procedures shown in FIGS. 7 and 8, the direct link can be established between the first terminal station 102 serving as the data transmission source and the second terminal station 103 serving as the data receiving destination, whereby direct communication can be performed according to the processing procedures shown in FIG. 9.

Fifth Embodiment

In the fifth embodiment also, the first terminal station 102 serving as the data transmission source starts establishing a direct link according to the procedures shown in FIG. 3, as a main unit. The starting trigger thereof and the direct link detecting processing are similar to that in the first embodiment. However, similar to the fourth embodiment, the fifth embodiment differs from the first embodiment in that the test packet is sent from the second terminal station 103 side serving as the data receiving destination, but direct link evaluation is performed with the second terminal station 103 instead of the first terminal station 102.

FIGS. 13A and 13B show procedures for direct link evaluating processing according to the fifth embodiment. With the evaluating processing relating to the present example, link establishing request processing by the first terminal station 102 is performed simultaneously.

First, the first terminal station 102 sends the Direct Link Test & Establishment Request packet addressed to the second terminal station 103 (step S1602) via the control station 101. When the second terminal station 103 is in the Awake state, the control station 101 transfers the Direct Link Test & Establishment Request packet (step S1303). The Direct Link Test & Establishment Request packet also serves as a Direct Link Establishment Request to indicate desire for a link establishing request, in addition to the test request as to the second terminal station 103. With the present embodiment, whether or not to respond to the link establishing is determined by the second terminal station 103.

By sending the Direct Link Test & Establishment Request packet employing the QoS Null Embedding Management Action defined by IEEE 802.11n-D1.0, this can be encapsulated in a data-type frame and sent in the IEEE 802.11 management format, as well as preventing outflow to the cable LAN 104. Information about the transmission rate supported by the first terminal station 102 and corresponding function information is written in the management frame in QoS Null.

Upon receiving the Direct Link Test Request packet (step S1304), the control unit 204 in the second terminal station 103 determines from the communication state whether itself is in a testable state, generates the Direct Link Test Confirm packet including such capability or not (step S1305), and relaying through the control station 101, sends this to the first terminal station 102 address (S1306). The control station 101 transfers the Direct Link Test & Establishment Request packet when the first terminal station 102 is in the Awake state (step S1307).

The Direct Link Test Confirm packet is also sent using the QoS Null Embedding Management Action. The Direct Link Test Confirm packet includes information about the transmission rate supported by the second terminal station 103 and corresponding function information. Also, in the case of indicating that testing is possible with this packet, the number of test packets to be sent is also included and sent. Also, statistical information about the wireless link between the second terminal station 103 and control station 101 is written together in the Direct Link Test Confirm packet.

If the Direct Link Test Confirm can be received from the second terminal station 103 (Yes in step S1308), the first terminal station 102 then confirms whether the second terminal station 103 is in a state capable of link testing (step S1309), based on the packet content herein.

At this time, if the second terminal station 103 is in a state capable of link testing, the first terminal station 102 starts the link test timer, and maintains the Awake state without entering Sleep until the test is ended (step S1310), and awaits reception of the packet (step S1231).

On the other hand, in the case that the Direct Link Test Confirm packet cannot be received from the second terminal station 103 (No in step S1308), the first terminal station 102 determines that the communication partner is not handling the autonomous direct link setup (DLS) function of the present invention, notifies this to the control unit 204, and returns the flow to normal operations in infrastructure mode (step S1321). In this case, the control unit 204 saves the address of the second terminal station 103 to the memory 205, and excludes the address of the second terminal station 103 from the transmission processing unit 202 from the next time and thereafter (step S1320).

Also, in the case that Direct Link Test Confirm from the second terminal station 103 can be received (Yes in step S1308) but receives a reply of "not testable" (No in step S1309), the first terminal station 102 notifies this to the control unit 204, and the flow is returned to normal operations. However, in this case the second terminal station 103 is not necessarily not corresponding to autonomous DLS function, so is not excluded from being subjected to direct link detecting.

In the case that the terminal station 103 is testable (Yes in step S1312), the transmission late supported by the second terminal station 103 is used to directly send the multiple test packets as to the first terminal station 102 without routing via the control station 101 (step S1313).

Note that in the case that both the first terminal station 102 and second terminal station 103 have a Transmit Beamforming function defined in the IEEE 802.11n-D1.0, the second terminal station 103 may use Transmit Beamforming to send the test packets in the above-mentioned step S1313. Thus, transmission quality of the direct link can be further improved (same as above).

Then either the link test timer expires (Yes in step S1314a), or the first terminal station 102 awaiting reception of the test packet continues to await reception until the data frame of MoreData=0 which shows that this is the last test packet is received (Yes in step S1314) and records the number of test packets received and the receiving power and the like.

Upon ending the reception of test packets (step S1315) from the second terminal station 103, the first terminal station 102 generates a Direct Link test Report packet with information aggregated such as the number of received test packets and the receiving power thereof, and sends this to the second terminal station 103 address via the control station 101 (step S1316). Statistical information about the wireless link between the control station 101 and first terminal station 102 may be written together in the Direct Link Test Report packet.

The control station 101 transfers the Direct Link Test Report packet when the second terminal station 103 is in the Awake state (step S1317).

Upon receiving the Direct Link Test Report packet (step S1318), the control unit 204 in the second terminal station 103 determines whether or not to perform a link establishing request as to the first terminal station 102, based on the content of the packet (step S1319). In the case that information about the wireless link between the control station 101 and first terminal station 102 is written in the Test Report packet received in step S1318, the second terminal station 103 may comprehensively determine the link performance of the direct link as compared to the case of routing via the control station 101.

The second terminal station 103 then generates a Direct Link Establishment Confirm packet with the determination results therein, and sends to the first terminal station 102 address via the control station 101 (S1320). This Direct Link Establishment Confirm packet is also sent employing QoS Null Embedding management Action. With the present embodiment, determination of the capability of direct link establishment receiving the test results of the wireless link is made at the second terminal station 103 side, and differs from the fourth embodiment in that the determination results are returned to the first terminal station 102 as Establishment Confirm.

The control station 101 transfers the Direct link Establishment Confirm when the first terminal station 102 is in the Awake state (step 1321).

Upon receiving the Direct link Establishment Confirm packet (step S1322), the first terminal station 102 interprets the determination results as to the capability of direct link establishment written in the packet (step S1323).

In the case that the second terminal station 103 determines that a direct link may be established (Yes in steps 1323 and 1325), the control units 204 of each terminal station 102 and 103 add each communication partner to the direct link list within the memory 205 (steps 1324 and 1326), and thereafter use direct link for communication with the communication partner. Thus, the establishment of a direct link is completed between the first terminal station 102 and the second terminal station 103.

On the other hand, in case the second terminal station 103 is not determined to be a partner sufficient to communicate with a direct link (No in steps S1323 and S1325), the control unit 204 in the first terminal station 102 saves the address of the communication partner in the memory 205, and returns the flow to the normal operating state in infrastructure mode (step S1321). The address of the second terminal station 103 is excluded from the link detecting at the transfer processing unit 202 from the next time and thereafter. Also, the control unit 204 in the second terminal station 103 does not add to the direct link list in the memory 205, so a direct link is not used for communication with the first terminal station 102 hereafter.

Note that in the case both the first terminal station 102 and the second terminal station 103 have a Transmit Beamforming function defined by IEEE 802.11n-D1.0, similar to the fourth embodiment, the second terminal station 103 may use the Transmit Beamforming to send the test packet. Thus, transmission quality of the direct link can be further improved (same as above).

With the present embodiment, there is an advantage wherein, by deferring the link establishing capability determination to the second terminal station 103 serving as the data receiving destination, the direct link establishing request/response processing can be included in the evaluating processing and thus simplified as compared to the fourth embodiment.

Thus, the evaluating processing of the direct link comes to a successful conclusion, and after the direct link establishing request/response, and the direct link is established between the first terminal station 102 serving as the data transmission source and the second terminal station 103 serving as the data receiving destination, direct communication can be performed according to the processing procedures shown in FIG. 9, similar to the first embodiment.

Sixth Embodiment

With the sixth embodiment, the second terminal station 103 serving as the data receiving destination starts establishing a direct link according to the procedures shown in FIG. 4, as a main unit. Hereafter, each process of the present embodiment will be described up to establishing a link.

Start Trigger

The second terminal station 103 uses the recognition of a packet addressed to itself by relay through the control station 101 as the start trigger, and advances the flow to the direct link detecting processing. With the determination of "relayed through the control station 101", determination can be made for the transmission processing unit 202 to detect "Address3≈BSSID" in the MAC header region in the packet addressed to itself (BSSID is a terminal station address contained in the control station. As shown in FIG. 16, in the case that the packet from the first terminal station 102 reached by relay through the control station 101, this becomes "Address3=STA1".

Alternatively, in the case that the first terminal station 102 serves as a content server, and the second terminal station 103 is a client to extract the information, the second terminal station 102 uses the operation for itself to send a content obtaining request as the start trigger, and advances the flow to the direct link detecting processing.

In the case of the above-mentioned start trigger conditions are satisfied, the data processing unit 201 in the second terminal station performs notification to the control unit 204, and starts direct link detecting processing S402. At this time, the MAC address written in the Address3 field in the packet addressed to itself indicates the address of the first terminal station 102 serving as the data transmission source (described above), but at this point in time it is yet unclear as to whether the first terminal station 102 is within range of direct link capability.

Direct Link Detecting Processing

With the present embodiment also, the direct link detecting S302 is performed by using normal send/receiving operations between the control station and terminal station performed in infrastructure mode, so minimal load is required for the system.

Figure 18:
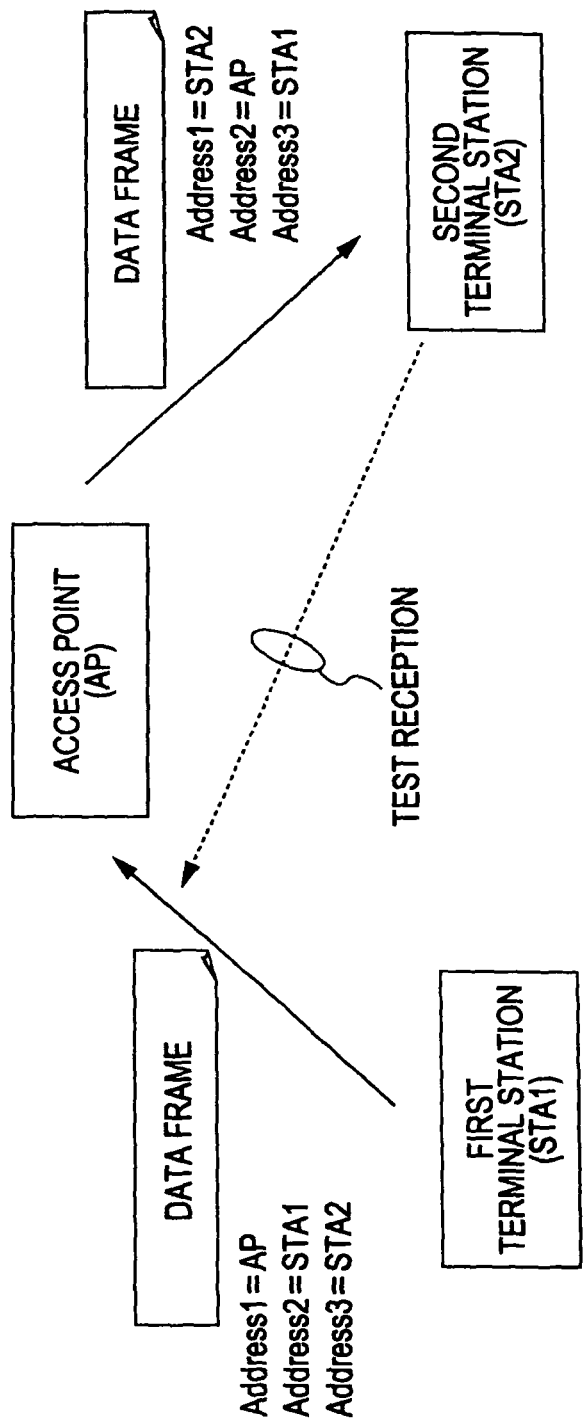
FIG. 18 is a diagram illustrating a state of transmitting a data frame from the first terminal station 102 to the second terminal station 103 while in infrastructure mode.
Figure 19:
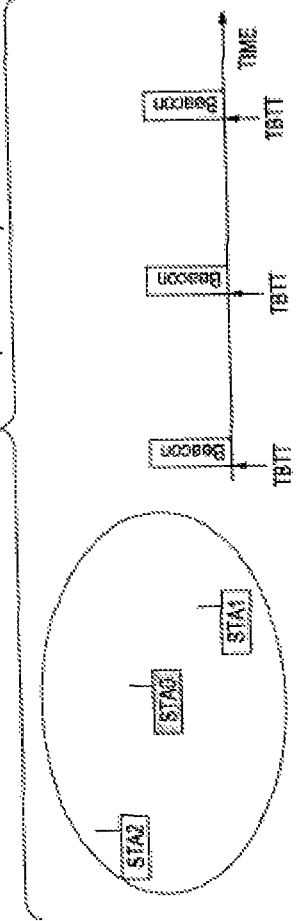
FIG. 19 is a diagram illustrating an operation example of IEEE 802.11 while in infrastructure mode.
Figure 20:
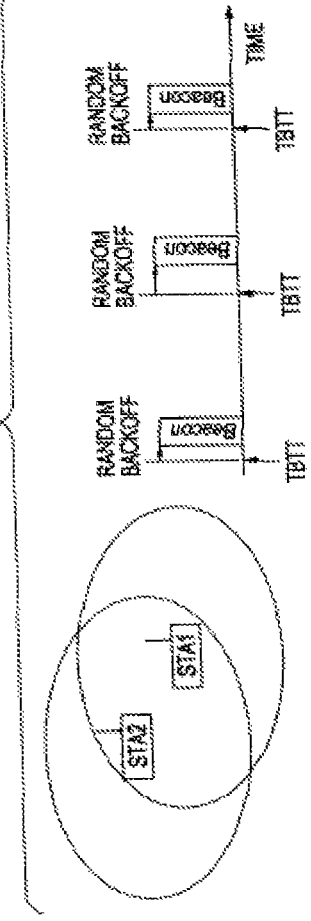
FIG. 20 is a diagram illustrating an operation example of IEEE 802.11 while in ad hoc mode.

FIG. 18 shows a state of transmitting a data frame from the first terminal station 102 to the second terminal station 103 while in infrastructure mode. As shown in the diagram, the first terminal station (STA1) 102 sends the data frame with the second terminal station 103 serving as the relay destination, addressed to the control station (AP) 101.

On the other hand, when the direct link detecting processing is started with the start trigger described above, the second terminal station 103 maintains the Awake state, and tests reception of packets sent addressed to itself from the first terminal station 102. As described above with reference to FIG. 17A, (Address1, Address2, Address3)=(AP, STA1, STA2) is written in the MAC header region of the packet addressed to the second terminal station 103 sent from the first terminal station 102 to the control station 101. Accordingly, the second terminal station 103 attempts reception of packets addressed to the control station 101 from the first terminal station 102, and if the second terminal station 103 can confirm that its own address is written in the Address3 field of the MAC header region, this confirms that the first terminal station 102 as a communication partner exists is a location wherein sufficient waves can reach, i.e. the direct link can be detected.

Thus the second terminal station 103 needs to await reception of normal data frames sent from the first terminal station 102. That is to say, direct link detecting processing can be performed without using a dedicated packet, to the processing load of the overall system can be suppressed.

FIG. 14 shows procedures for the direct link detecting processing according to the sixth embodiment. Upon the second terminal station (STA2) 103 switching to direct link detecting processing S402, the link detecting timer is started (step S1402), and hereafter until the timer is expired, monitors the packet before the relay addressed to the control station and monitors whether or not there are any packets wherein the relay destination is itself (step S1405).

In step S1405, specifically, the transmission processing unit 202 in the second terminal station 103 monitors whether or not there are any packets with "Address3=MAC address of self" in the receiving operations. Thus if the packet is not addressed to itself but the second terminal station 103 can receive the packet sent by the first terminal station 102 toward the control station 101, recognition can be made that the first terminal station 102 is attempting to sent a packet addressed to itself, since its own MAC address is written in the Address3 field (see FIG. 18).

The first terminal station 102 sends the data frame addressed to the second terminal station 103 via the control station 101 with normal operations in infrastructure mode (step S1403). The control station 101 transfers the data frame to the second terminal station 103 to match the timing for the second terminal station 103 to switch to the Awake state (step S1404), whereby the second terminal station 103 can receive the data frame with normal operations.

At this time, the second terminal station 103 starts the direct link detecting processing, receives the data frame sent by the first terminal station 102 in step S1403 until the link detecting timer expires, and further when the transmission processing unit 202 can confirm that its own MAC address is written in the Address3 field in the MAC header region (Yes in step S1405), the first terminal station 102 can hold the data addressed to itself, and can confirm that it is in a location capable of a direct link. In this case, the transmission processing unit 202 notifies to the control unit 204 that such a packet has been detected. The second terminal station 103 then advances the flow to the link evaluating processing (step S1407).

On the other hand, in the case that the link detecting timer is expired (No in step S1408), without being able to receive the data frame sent by the first terminal station 102 in step S1403, or if the data frame can be received but without confirmation made that the MAC address of the second terminal station 103 itself is written in the Address3 field of the MAC header region (No in step S1405), the second terminal station 103 determines that the first terminal station 102 serving as the communication partner is not within range of a direct link, or has a node connected to the cable LAN, and notifies this to the control unit 204. The control unit 204 saves the address of the first terminal station 102 in the memory 205 (step S1409), the link detecting processing is ended in failure, and the flow is returned to the normal operation state in infrastructure mode (step S1410). The address of the first terminal station 102 is saved in the memory 205, so the address of the first terminal station 102 from the next time and thereafter is excluded from direct monitoring with the transmission processing unit 202.

The direct link detecting processing is thus performed, and after the processing comes to a successful conclusion, the direct link can be established by performing direct link evaluation processing and direct link establishing request/response processing similar to the first through fifth embodiments by exchanging the roles of the first terminal station 102 serving as the data transmission source and the second terminal station 103 serving as the data receiving destination.

Also, with the sixth embodiment, similar to the first embodiment, communication can be performed after establishment of the direct link, according to the processing procedures shown in FIG. 9. If the data can be delayed, after establishing the direct link between the first terminal station 102 and second terminal station 103, each terminal station can be operated in Power Save mode.

Seventh Embodiment

Up to this point, for simplification of description, one control station and only one pair of terminal stations 102 and 103 serving as communication partners are contained in the BSS set up by the control station, but the essence of the present invention is not limited to this. The present invention can be applicable even in a case wherein three or more terminal stations are contained in one BSS to perform data communication with arbitrary terminal combinations. Also, the present invention can be applicable with a configuration of two or more control stations, wherein the network configuration (ESS: Extended Service Set) is a system environment wherein communication is performed between control stations, i.e. the network configuration mutually connects the BSS which is a basic unit of the wireless LAN with IEEE 802.11 standards with multiple control stations.

If the negotiation packets such as the above-described Direct Link Test Request/Confirm/Report packets or the Direct Link Establishment Request/Confirm packets are encapsulated in the data frame, such negotiation can be performed across a cable network.

Figure 15:
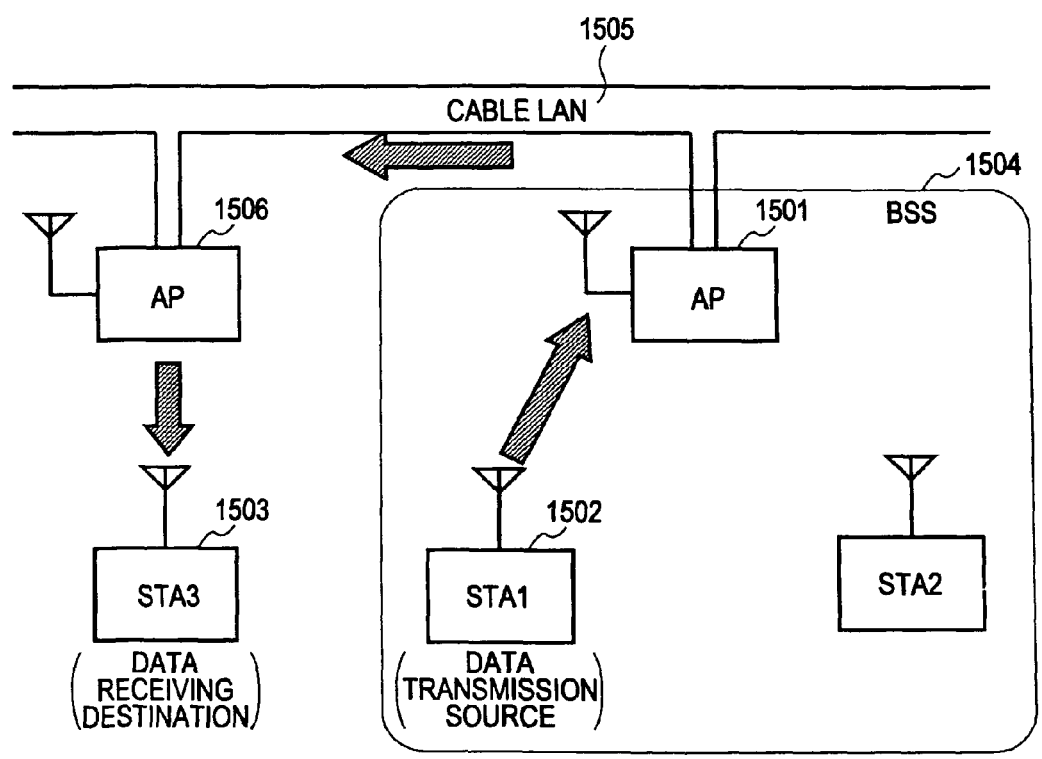
FIG. 15 is a schematic diagram showing a configuration embodiment of another communication system to which the present invention is applicable.

FIG. 15 shows a schematic view of a configuration example of another communication system to which the present invention is applicable. In the same diagram, the control station 1501 carries out the BSS shown by reference numeral 1504, and contains the first terminal station (STA1) 1502 and second terminal station (STA2). Also, the other control station 1506 contains a third terminal station (STA3). The two control stations 1501 and 1506 are mutually connected via a cable LAN 1505, and make up the ESS.

With the example shown, the third terminal station (STA3) 1503 is contained in the control station 1506 which differs from the first terminal station (STA1) 1502, but in the case that the third terminal station (STA3) 1503 has an autonomous DLS function similar to the second terminal station (STA2), if the third terminal station (STA3) is in a location wherein packets from the first terminal station 1502 can be directly receives, a direct link can be established according to the procedures similar to the first through sixth embodiments, and direct communication using Power Save can be performed.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication system wherein packet transmission operations are carried out in an infrastructure mode, said wireless communication system comprising:
   a first terminal station serving as a data transmission source;
   a second terminal station serving as a data receiving destination; and
   a control station configured to contain each terminal station and relay a packet transmitted between the two terminal stations,
   wherein said first terminal station sends a direct link test request to said second terminal station via said control station, and following receiving a confirmation response as to said direct link test request from said second terminal station via said control station, directly sends test packets to address of said second terminal station, wherein said second terminal station records information comprising a number of test packets received from said first terminal station or receiving power thereof, and sends a report packet with said recorded information written therein to said first terminal station via said control station, wherein said first terminal station performs evaluation of a direct link between said first terminal station and said second terminal station, based on said recorded information written in said report packet, and wherein said first or second terminal stations employ Qos Null Embedding Management Action which is defined in IEEE 802.11n-D1.0 to encapsulate a data-type frame and send said direct link test request or said confirmation response thereto.

2. The wireless communication system according to claim 1, wherein said second terminal station writes information relating to a wireless link between said control station and said second terminal station into said confirmation response, and wherein said first terminal station performs evaluation of said direct link between said first terminal station and said second terminal station, based on said recorded information written in said report packet, and said information relating to said wireless link between said control station and said second terminal station.

3. A wireless communication system wherein packet transmission operations are carried out in an infrastructure mode, said wireless communication system comprising:
   a first terminal station serving as a data transmission source;
   a second terminal station serving as a data receiving destination; and
   a control station configured to contain each terminal station and relay a packet transmitted between the two terminal stations,
   wherein a direct link is established between said first terminal station and said second terminal station, wherein said first terminal station sends a direct link communication request to address of said second terminal station via said control station, and starts direct communication with said second terminal station in accordance with a confirmation response received from said second terminal station via said control station, wherein said first terminal station and said second terminal station are operated with a low-power operation mode to perform receiving operations intermittently even during the time that said direct link is established there between, and wherein said control station manages start-up state of each terminal station, and transfers a direct link communication request along with timing for said second terminal station to be in awake state, while transferring said confirmation response along with timing for said first terminal station to be in awake state.

4. The wireless communication system according to claim 3, wherein said first or second terminal stations employ Qos Null Embedding Management Action which is defined in IEEE 801.11n-D1.0 to encapsulate a data-type frame and send said direct link communication request or said confirmation response thereto.

5. A wireless communication system wherein packet transmission operations are carried out in an infrastructure mode, said wireless communication system comprising:
a first terminal station serving as a data transmission source;
a second terminal station serving as a data receiving destination; and
a control station configured to contain each terminal station and relay a packet transmitted between the two terminal stations,
wherein said first terminal station directly sends a test packet to said second terminal station for testing a direct line, wherein detection is made that said second terminal station is within range capable of a direct link, and evaluation is performed of said direct link between said first terminal station and said second terminal station, based on a number of times an acknowledge packet is returned from said second terminal station and receiving power thereof, and wherein said first or second terminal stations employ Qos Null Embedding Management Action which is defined in IEEE 801.11n-D1.0 to encapsulate a data-type frame and send a direct communication request via said test packet or a confirmation response in form of said acknowledge packet thereto.

6. A wireless communication system wherein packet transmission operations are carried out in an infrastructure mode, said wireless communication system comprising:
a first terminal station serving as a data transmission source;
a second terminal station serving as a data receiving destination; and
a control station configured to contain each terminal station and relay a packet transmitted between the two terminal stations,
wherein said first terminal station sends a direct link test request to said second terminal station via said control station, and following receiving a confirmation response as to said direct link test request from said second terminal station via said control station, directly sends test packets to address of said second terminal station, wherein said second terminal station records information comprising a number of test packets received from said first terminal station or receiving power thereof, and performs evaluation of a direct link between said first terminal station and said second terminal station, based on said recorded information, and sends results of said evaluation of the direct link thereof to said first terminal station via said control station, and wherein said first or second terminal stations employ Qos Null Embedding Management Action which is defined in IEEE 802.11n-D1.0 to encapsulate a data-type frame and send said direct link test request or said confirmation response thereto.

7. The wireless communication system according to claim 6, wherein said first terminal station writes information relating to a wireless link between said first terminal station and said control station in said direct link test request, and wherein said second terminal station performs evaluation of said direct link between said first terminal station and said second terminal station, based on said recorded information, and said information relating to said wireless link between said first terminal station and said control station.

8. A wireless communication system wherein packet transmission operations are carried out in an infrastructure mode, said wireless communication system comprising:
a first terminal station servicing as a data transmission source;
a second terminal station serving as a data receiving destination; and
a control station configured to contain each terminal station and relay a packet transmitted between the two terminal stations,
wherein said first terminal station sends a direct link test request to said second terminal station via said control station, wherein said second terminal station sends a test packet to address of said first terminal station following sending a confirmation response as to said direct link test request from said first terminal station via said control station, wherein said first terminal station records information including a number of test packets received from said second terminal station and performs evaluation of a direct link between said first terminal station and said second terminal station based on said recorded information.

9. The wireless communication system according to claim 8, wherein said second terminal station writes information relating to a wireless link between said control station and said second terminal station into said confirmation response as to said direct link test request, and wherein said first terminal station performs evaluation of said direct link between said first terminal station and said second terminal station, based on said recorded information, and said information relating to said wireless link between said control station and said second terminal station.

10. The wireless communication system according to claim 8, wherein said first or second terminal stations employ Qos Null Embedding Management Action which is defined in IEEE 802.11n-D1.0 to encapsulate a data-type frame and send said direct link test request or said confirmation response thereto.

11. A wireless communication system wherein packet transmission operations are carried out in an infrastructure mode, said wireless communication system comprising;
a first terminal station serving as a data transmission source;
a second terminal station serving as a data receiving destination; and
a control station configured to contain each terminal station and relay a packet transmitted between the two terminal stations,
wherein said first terminal station sends a direct link test request to said second terminal station via said control station, wherein said second terminal station directly sends a test packet to address of said first terminal station following sending a confirmation response as to said direct link test request form said first terminal station via said control station, wherein said first terminal station records information including a number of test packets received from said second terminal station or receiving power thereof and sends a report packet with said recorded information to said second terminal station via said control station, and wherein said second terminal station records information including a number of test packets received from said second terminal station and performs evaluation of a direct link between said first terminal station and said second terminal station, based on the recorded information.

12. The wireless communication system according to claim 11, wherein said first terminal station writes information relating to a wireless link between said first terminal station and said control station in said report packet, and wherein said second terminal station performs evaluation of said direct link between said first terminal station and said second terminal station based on said recorded information, and information relating to said wireless link between said control station and said first terminal station.

* * * * *